US012565709B2

(12) United States Patent  
Asadi et al.

(10) Patent No.: US 12,565,709 B2  
(45) Date of Patent: Mar. 3, 2026

(54) METHODS AND DEVICES USING TRI-TRANSITION METAL PHOSPHIDES FOR EFFICIENT ELECTROCATALYTIC REACTIONS

(71) Applicant: ILLINOIS INSTITUTE OF TECHNOLOGY, Chicago, IL (US)

(72) Inventors: Mohammad Asadi, Chicago, IL (US); Alireza Kondori, Chicago, IL (US); Mohammadreza Esmaeilirad, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 1010 days.

(21) Appl. No.: 17/440,265

(22) PCT Filed: Mar. 19, 2020

(86) PCT No.: PCT/US2020/023563

§ 371 (c)(1),  
(2) Date: Sep. 17, 2021

(87) PCT Pub. No.: WO2020/191162

PCT Pub. Date: Sep. 24, 2020

(65) Prior Publication Data

US 2022/0154354 A1    May 19, 2022

Related U.S. Application Data

(60) Provisional application No. 62/820,484, filed on Mar. 19, 2019.

(51) Int. Cl.  
*C25B 1/50* (2021.01)  
*C01B 25/08* (2006.01)  
(Continued)

(52) U.S. Cl.  
CPC ............ *C25B 11/077* (2021.01); *C01B 25/08* (2013.01); *C25B 1/04* (2013.01); *C25B 1/50* (2021.01);  
(Continued)

(58) Field of Classification Search  
CPC ....... C25B 1/04; C25B 11/051; C25B 11/052; C25B 11/073; C25B 11/075  
See application file for complete search history.

(56) References Cited

U.S. PATENT DOCUMENTS 4,523,981 A    6/1985 Ang et al.  
9,528,192 B1    12/2016 Chen  
(Continued)

FOREIGN PATENT DOCUMENTS

CN    107362818 A * 11/2017 .......... C25B 11/091  
IN    2017/31029391 A    9/2017  
(Continued)

OTHER PUBLICATIONS

F. Li, G.-F. Han, H.-J. Noh, Y. Lu, J. Xu, Y. Bu, Z. Fu, J.-B. Baek, Construction of Porous Mo3P/Mo Nanobelts as Catalysts for Efficient Water Splitting, Angew. Chem. Int. Ed. 2018, 57, 14139. (Year: 2018).*  
(Continued)

*Primary Examiner* — Luan V Van  
*Assistant Examiner* — Mofoluwaso S Jebutu  
(74) *Attorney, Agent, or Firm* — Pauley Erickson & Swanson

(57) ABSTRACT

Methods and devices for generating hydrogen gas with an electrocatalytic energy conversion cell by introducing a tri-transition metal phosphide catalyst at or on an electrode of the electrocatalytic energy conversion cell. The electrocatalytic energy conversion cell includes a first electrode including a tri-transition metal phosphide catalyst, such as  
(Continued)

$Mo_3P$, a second electrode of an anodic material, an electrolyte disposed between the first electrode and the second electrode, and an electric potential source connected to both electrodes. Oxidation and reduction reactions, such as hydrogen evolution reactions, occur at the first electrode.

13 Claims, 18 Drawing Sheets

(51) Int. Cl.
    *C25B 1/04*           (2021.01)
    *C25B 11/077*       (2021.01)

(52) U.S. Cl.
    CPC ...... *C01P 2004/17* (2013.01); *C01P 2004/62*
          (2013.01); *C01P 2004/64* (2013.01); *C01P*
                        *2006/40* (2013.01)

(56) References Cited

U.S. PATENT DOCUMENTS

| | | | |
|---|---|---|---|
| 9,799,893 | B2 | 10/2017 | Campbell |
| 2012/0018311 | A1 | 1/2012 | Yotsuhashi et al. |
| 2015/0259810 | A1* | 9/2015 | Lewis .................... B01J 27/186 |
| | | | 204/291 |
| 2016/0145752 | A1 | 5/2016 | Salehi et al. |
| 2016/0172688 | A1 | 6/2016 | Kim et al. |
| 2017/0015558 | A1* | 1/2017 | Zhang ........................ C25B 1/04 |
| 2017/0267109 | A1 | 9/2017 | Graefenstein et al. |
| 2018/0023198 | A1 | 1/2018 | Graetzel et al. |
| 2018/0327918 | A1* | 11/2018 | Wang .................... C25B 11/051 |
| 2021/0013566 | A1 | 1/2021 | Asadi et al. |
| 2021/0115572 | A1 | 4/2021 | Asadi et al. |

FOREIGN PATENT DOCUMENTS

| | | |
|---|---|---|
| WO | WO 2016/100204 A2 | 6/2016 |
| WO | WO 2017/112557 A1 | 6/2017 |
| WO | WO-2018175594 A1 * | 9/2018 |

OTHER PUBLICATIONS

ISA/US, English language verison of the International Search Report, Form PCT/ISA/210, for International Application PCT/US2020/023563, Jun. 22, 2020 (3 pages).

ISA/US, Form PCT/ISA/237, Written Opinion of the International Searching Authority, for International Application PCT/US2020/023563, Jun. 22, 2020 (5 pages).

Li, N. et al., Understanding of Electrochemical Mechanisms for CO2 Capture and Conversion into Hydrocarbon Fuels in Transition-Metal Carbides (MXenes), ACS Nano, Sep. 11, 2017, 10825-10833.

* cited by examiner

METHODS AND DEVICES USING TRI-TRANSITION METAL PHOSPHIDES FOR EFFICIENT ELECTROCATALYTIC REACTIONS

CROSS REFERENCE TO RELATED APPLICATION

This application is a National Phase entry of PCT International Patent Application PCT/US2020/023563, filed on 19 Mar. 2020, which claims priority to and the benefit of U.S. Provisional Application Ser. No. 62/820,484, filed on 19 Mar. 2019. The co-pending application is hereby incorporated by reference herein in its entirety and is made a part hereof, including but not limited to those portions which specifically appear hereinafter.

FIELD OF THE INVENTION

This invention relates generally to the field of catalysts, catalysis, electrocatalytic reactions performed with such catalysts, and methods for producing the same. The invention also relates to electrodes, various electrochemical devices, electrocatalytic energy conversion, and storage systems using such catalytic materials. More specifically, the invention relates to methods and devices incorporating tri-transition metal phosphide (TMPs) catalysts for electrocatalytic reactions, such as for producing hydrogen, preparation methods for making the TMPs, and devices and systems of using the same.

BACKGROUND OF THE INVENTION

Solid-state electrocatalysis plays a crucial role in the development of renewable energy to reshape current and future energy needs. However, finding an inexpensive and highly active catalyst to replace precious metals remains a challenge in a technology that mainly rely on precious metals such as Platinum (Pt), Palladium (Pd), and Silver (Ag). Two-dimensional nanomaterials such as molybdenum disulfide ($MoS_2$) and carbide ($Mo_2C$) have been identified as promising candidates to replace precious metal catalysts owing to the unique electronic properties of their edge structures. However, the basal plane of these catalysts contains substantial amount of their surface structure, and remains nearly inactive making these catalysts inefficient, especially for practical applications, Therefore, designing and developing a new class of non-precious metal catalysts with increased intrinsic activity that concurrently hold high number of active sites, remains as a challenging task in the field of electrocatalysis.

SUMMARY OF THE INVENTION

The present invention has been made in consideration of the above-described problems of the conventional techniques. A general object thereof is to provide catalysts that are earth abundant and made of non-precious metal with beneficial catalytic properties that can be used for electrocatalytic processes. The invention may be generally described, without limiting the scope, as such catalysts, catalyst systems, and methods, devices and apparatus of manufacturing, providing, establishing, supporting, and/or using such catalyst systems.

Embodiments of this invention include tri-transition metal catalysts, such as tri-transition metal phosphides (TMPs), in electrocatalytic energy conversion and storage systems, particularly beneficial for hydrogen evolution reaction (HER). One exemplary catalyst of this invention includes of tri-molybdenum phosphide ($Mo_3P$). The catalyst can be included in nanoparticles and/or otherwise nano structured.

Embodiments of this invention include an electrocatalytic energy conversion cell. The cell can include a first electrode including the tri-transition metal phosphide catalyst and a second electrode comprising an anodic material. An electrolyte is disposed between the first electrode and the second electrode, and an electric potential source is connected to both electrodes. The cell can be embodied as or incorporated in a suitable device for collecting reaction materials, and can include various sizes, shapes, numbers, and/or configuration of electrodes and/or electrolyte housing.

The catalyst is desirably disposed between the electrode(s), such that the cell is configured for oxidation and reduction reactions at the first electrode. The first electrode can be coated with the catalysts, which can be in any nanostructured form (e.g., 1-1000 nm). Exemplary catalysts include $Ti_3P_m$, $V_3P_m$, $Cr_3P_m$, $Zr_3P_m$, $Nb_3P_m$, $Mo_3P_m$, $Hf_3P_m$, $W_3P_m$, $Ta_3P_m$, $Tc_3P_m$, $Re_3P_m$, and combinations thereof, wherein m is independently one of 1, 2, 3, 4 or 5.

In some instances, the catalyst is included in hydrogen evolution reactions (HER) and electrodes for such electrocatalytic reaction. The invention includes methods of improving HER though use of the catalyst, such as by incorporating the catalyst at an electrode. The catalysts can be included in different forms and structures. In embodiments of the invention, the catalyst improves formation of hydrogen gas at a lower overpotential and with high reaction rates.

Embodiments of the invention include a method of generating hydrogen gas, such as in an electrocatalytic energy conversion cell as described above. The method includes steps of: applying an electrical potential to both electrodes; reducing hydrogen ions in the electrolyte at the first electrode; and collecting the hydrogen gas.

Embodiments of this invention can provide one or more of the following advantages: (1) the overpotential required to derive HER is decreased to as low as 21 mV vs RHE which is among the closest value to Pt reported to date, confirming its superior catalytic activity; and (2) employing TMP catalyst results in high yield $H_2$ production while the catalyst is a both earth-abundant and stable, with a production that can be easily scaled up.

Other objects and advantages will be apparent to those skilled in the art from the following detailed description taken in conjunction with the appended claims and drawings.

BRIEF DESCRIPTION OF THE FIGURES

FIG. 2A depicts a high-angle annular dark field (HAADF) image of $Mo_3P$ crystal (scale bar, 50 nm).

FIG. 2B depicts a unit cell of $Mo_3P$ with lattice parameters of a=b=9.86 Å and c=4.85 Å.

FIG. 2C depicts atomic resolution HAADF (scale bar, 1 nm). Insets in (c) shows the crystal orientation.

FIG. 2D depicts annular bright field (ABF) images of $Mo_3P$ at <110> zone axis (scale bar, 1 nm). Insets show the corresponding Fast Fourier transform (FFT).

FIG. 2E depicts energy-loss near edge fine structure (ELNES) of P-$L_{2,3}$ edge showing the evolution of $L_{2,3}$ pre-peak as a function of distance from the surface (110).

FIG. 2F depicts energy-loss near edge fine structure (ELNES) of P-$L_{2,3}$ edge.

FIG. 2G shows ELNES of the Mo-$M_3$ edge for $Mo_3P$ and MoP.

FIG. 3A depicts iR-corrected (85% compensation for $R_u$) cyclic voltammetry (CV) plots with respect to RHE at scan rate of 50 mV/s. The recorded onset potentials for $Mo_3P$, MoP, $Mo_2C$ and $MoS_2$ are 21, 63, 82 and 144 mV, respectively.

FIG. 3B depicts in-situ DEMS results for determining HER onset potential.

FIG. 3C depicts the corresponding CV plot of $Mo_3P$ at scan rate of 50 mV/s for in-situ DEMS.

FIG. 3D depicts measuring the number of transferred electrons per mole of evolved hydrogen at an overpotential of 200 mV using in-situ DEMS.

FIG. 4A depicts calculated $H_2$ formation rate for $Mo_3P$, MoP, $Mo_2C$ and $MoS_2$ representing molar quantities of products per gram of catalysts based on the iR-corrected CV results. In all the electrochemical experiments, 0.5 mg of the catalyst is coated on a 1 $cm^2$ glassy carbon electrode.

FIG. 4B depicts measured Tafel slopes and corresponding exchange current densities based on the iR-corrected CV results.

FIG. 4C depicts electrochemical impedance spectroscopy (EIS) experiments to study the charge transfer resistance ($R_{ct}$) at an overpotential of 200 mV vs RHE.

FIG. 4D depicts iR-corrected CV curves recorded at a scan rate of 50 mV/s in 0.5M $H_2SO_4$ showing the cycle stability of the $Mo_3P$ for HER. CV results indicate less than 3 mV increase in the required overpotential to achieve −10 $mA/cm^2$ after 1000 cycles. Inset shows chronoamperometry (CA) experiment showing the long-term stability of $Mo_3P$ catalyst in 0.5 M $H_2SO_4$ at an overpotential of 200 mV vs RHE. The average current density of −34 $mA/cm^2$ was achieved for the $Mo_3P$ over 40 hrs with negligible loss (less than 9.3% loss in current density).

FIG. 5A depicts Bader charges of $Mo_3P$ (110).

FIG. 5B depicts total element projected densities of states for $Mo_3P$ (110) slab.

FIG. 5C depicts comparison of Mo-PDOS for MoP (100) and for $Mo_3P$ (110) slabs.

FIG. 5D depicts comparison of absolute work function for each catalyst, indicating lower work function for $Mo_3P$ (110) and thus the higher availability of electrons in $Mo_3P$ (110) slab.

DETAILED DESCRIPTION OF THE INVENTION

The present invention provides and/or incorporates tri-transition metal phosphides (TMPs) for use in electrocatalytic energy conversion and storage systems. The catalyst can be included in such devices or systems in the form of nanoparticles and/or other nanostructures. In some instances, the catalyst is included in or on a hydrogen evolution reaction (HER) electrode.

Figure 1:
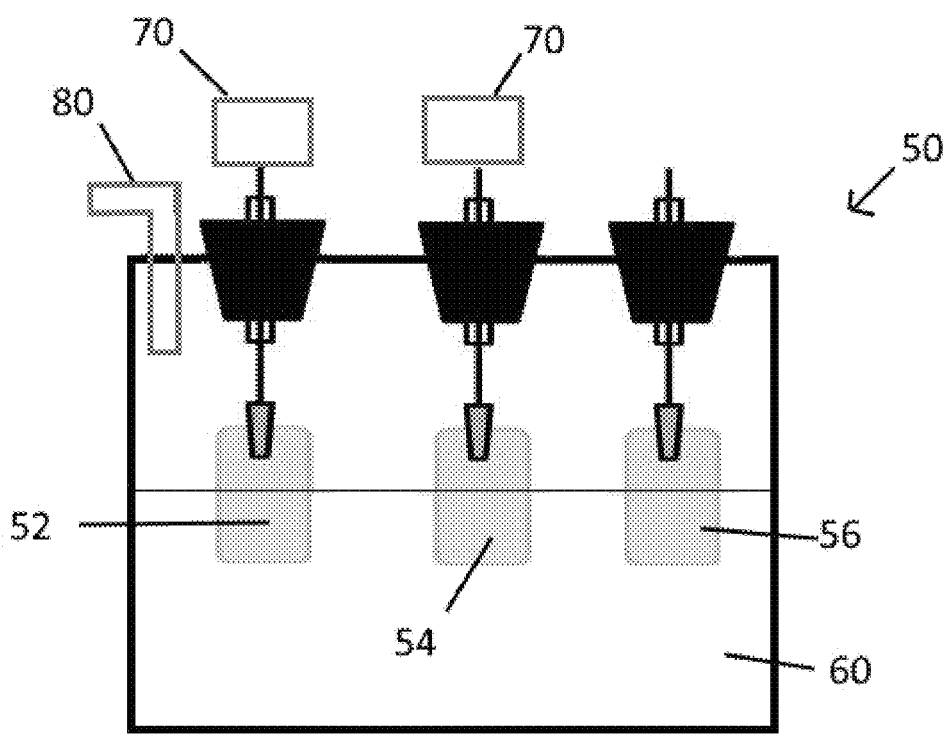
FIG. 1 is a schematic illustration of an electrocatalytic cell according to one embodiment of this invention.

FIG. 1 shows an exemplary and generally illustrated electrocatalytic energy conversion cell 50. The cell is simply and schematically shown, and can be embodied in variously configured devices of various sizes and numbers of components. The cell 50 includes a first electrode 52 and a second electrode 54. The first electrode 52 is the working electrode, here a cathode including the catalyst of this invention. The second electrode 54 is the counter electrode, and comprises an anodic material to complete the circuit with the first electrode. The cell 50 is illustrated with a third, or reference, electrode 56, which can optionally be included depending on need. An electrolyte 60 is disposed between, and in contact with, the first electrode 52 and the second electrode 54. An electric potential source 70 is connected to the first electrode 52. The same electric potential source 70 or a second electric source is connected to the second electrode 54. A collector 80 is included to collect the desired reactant product gas, and can be any suitable apparatus known in the art.

The electrode 52 can be coated with the tri-transition metal phosphide catalyst by any suitable method, such as a drop casting method. The base electrode material can be or include carbon or other suitable material, such as a glassy carbon electrode. Any suitable materials can be used for the other electrodes, such as, without limitation, carbon, platinum, and/or silver materials. Exemplary tri-transition metal catalysts include one or more of $Ti_3P_m$, $V_3P_m$, $Cr_3P_m$, $Zr_3P_m$, $Nb_3P_m$, $Mo_3P_m$, $Hf_3P_m$, $W_3P_m$, $Ta_3P_m$, $Tc_3P_m$, and $Re_3P_m$, wherein m is independently one of 1, 2, 3, 4 or 5. The electrolyte can be any suitable material for producing the desired end product(s). For example, for hydrogen production the electrolyte can be, without limitation, strong acids, for example, a sulfuric acid ($H_2SO_4$) electrolyte.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

The present invention discloses the onset potential of $Mo_3P$ nanoparticles in the HER is as low as 21 mV, which is among the closest value to Pt (known as the best HER catalyst) yet reported, using cyclic voltammetry (CV) and in-situ differential electrochemical mass spectroscopy (DEMS). The onset potential is also seven, four, and three times lower than other recently developed non-precious metal catalysts, i.e., $MoS_2$, $Mo_2C$ and molybdenum phosphide (MoP) nanoflakes (NFs), respectively. The turnover frequency (TOF) measurements, actual activity of surface atoms, at 150 mV overpotential also offer 5.3-fold activity improvement for the $Mo_3P$ catalyst than that of $MoS_2$ NFs. Atomic scale characterization such as scanning transmission electron microscopy (STEM), electron energy loss spectroscopy (EELS) and x-ray absorption near edge structure (XANES) results indicate that the unique structure of $Mo_3P$ provides a high density of Mo atoms on the surface that are responsible for charge transfer during the reaction.

Density functional theory (DFT) calculations and ultraviolet photoelectron spectroscopy (UPS) results illustrate that the observed low onset potential is mainly due to low work function of $Mo_3P$ compared to other studied catalysts. The results also confirm that the high HER performance of $Mo_3P$ are mainly due to the ideal adsorption free energy of hydrogen ($\Delta G_H^*$=0 eV) at above ½ monolayer (ML) coverage of the (110) surface exceeding the performance of existing non-noble metal catalysts, e.g., $Mo_2C$ ($\Delta G_H^*$=−0.128 eV) and $MoS_2$ ($\Delta G_H^*$=0.08 eV) for HER.

Figure 4:
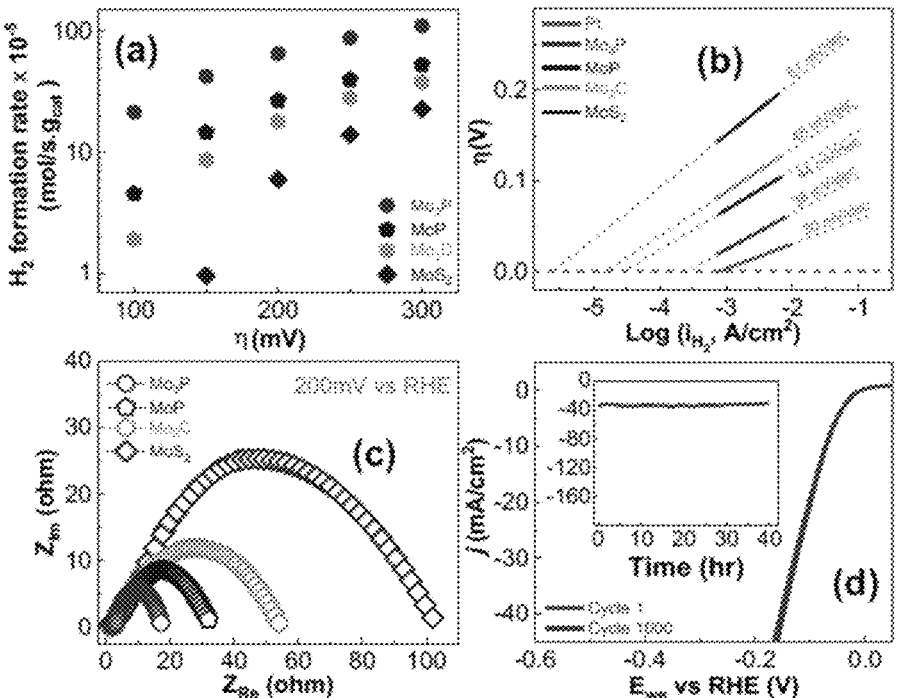
FIGS. 4A-D depict Electrochemical performance of $Mo_3P$ nanoparticles.

FIG. 4a demonstrates the product formation rate normalized to the catalyst mass loading per unit surface area (In all electrochemical experiments, 0.5 mg of catalyst was coated on 1 $cm^2$ glassy carbon electrode), comparing the molar quantity of $H_2$ formation (mol/s·$g_{cat}$) for each synthesized catalyst, i.e., $Mo_3P$ nanoparticles, MoP, $Mo_2C$, and $MoS_2$ NFs. The results show that at an overpotential of 100 mV, $H_2$ is formed at a rate of about 214.7 μmol/s·$g_{cat}$ for $Mo_3P$ nanoparticles, approximately 4.7 times higher than for MoP (45.7 μmol/s·$g_{cat}$). The product formation rate for $Mo_3P$ nanoparticles is also 11.2 times greater compared to $Mo_2C$ NFs (about 19.1 μmol/s·$g_{cat}$) while $MoS_2$ NFs are inactive for HER at this potential. At an overpotential of 150 mV the $H_2$ formation rate of $Mo_3P$ nanoparticles (424.7 μmol/s·$g_{cat}$) is about 44-fold higher than $MoS_2$ NFs (9.6 μmol/s·$g_{cat}$). FIG. 4a also illustrates that $H_2$ formation rate is considerably higher for $Mo_3P$ nanoparticles over the entire range of overpotentials.

The long-term stability of the $Mo_3P$ catalyst has negligible loss (about 9.2%) after 40 hours continuous process, confirmed by chronoamperometry results.

Figure 7:
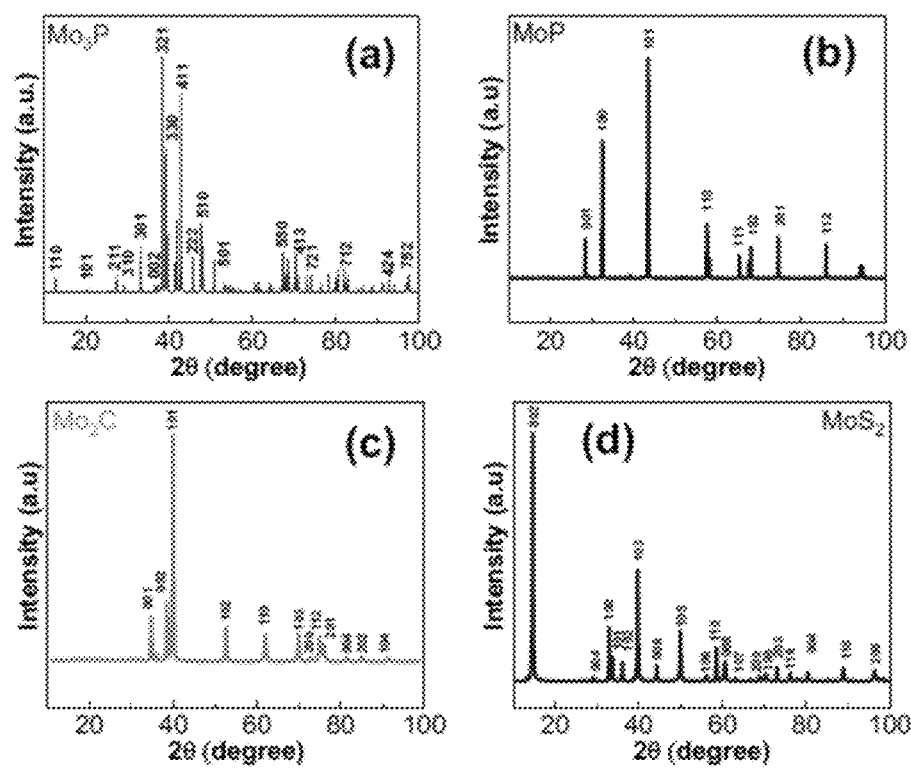
FIG. 7 shows an XRD spectra of (a) $Mo_3P$ nanoparticles and (b) MoP (c) $Mo_2C$ (d) $MoS_2$ nanoflakes.

A colloidal chemistry method followed by a thermal sintering process was employed to synthesize $Mo_3P$ nanoparticles, MoP and $Mo_2C$ NFs (section S1). $MoS_2$ NFs were also synthesized using liquid exfoliation of the bulk material. The XRD pattern of the synthesized $Mo_3P$ nanoparticles is also shown in FIG. 7a. As shown in these figures, the peaks at 13°, 20°, 38°, and 40° correspond to (110), (101), (321), and (112) crystal surfaces of $Mo_3P$, respectively, confirming the crystalline structure of the synthesized material. It can also be deduced that the cubic crystal structure of metal Mo, Im$\bar{3}$m is transformed to the tetragonal structure, $I\bar{4}$ 2m in $Mo_3P$ where each Mo atom is coordinated by either two or four P atoms. The $Mo_3P$ particle size for the (110) surface structure is calculated to be around 150 nm using Scherrer equation where a particle sizes of 75, 110 and 120 nm is obtained for MoP (100), $Mo_2C$ (001) and $MoS_2$ (100), respectively.

Figure 2:
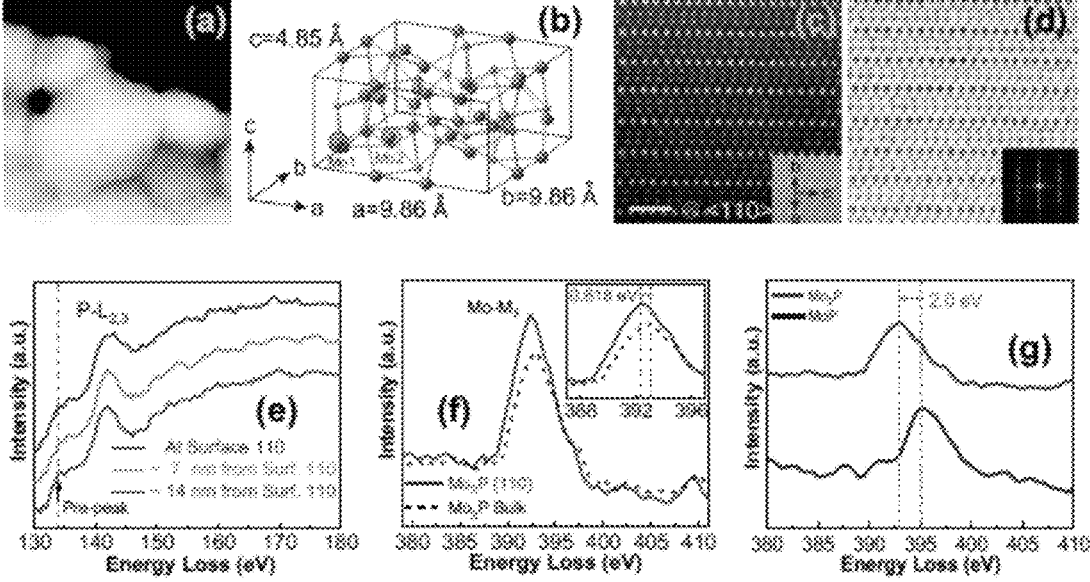
FIGS. 2A-G depict characterizations of $Mo_3P$ nanoparticles.
Figure 8:
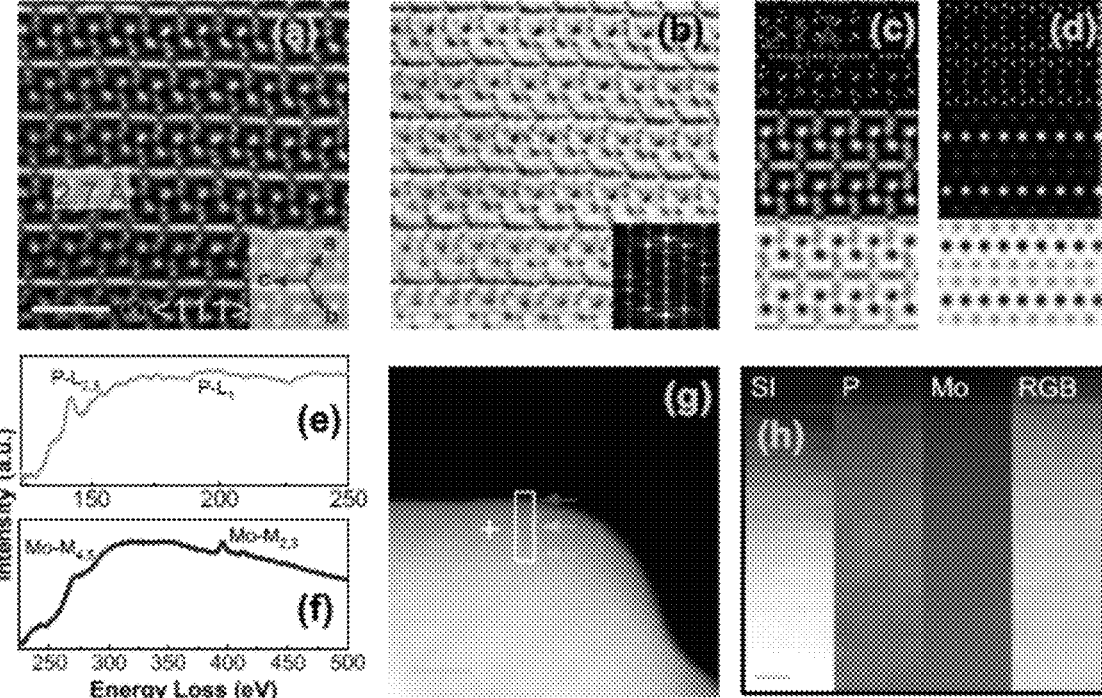
FIG. 8 shows: (a) atomic resolution HAADF (scale bar, 1 nm); (b) ABF images of $Mo_3P$ in <111> zone axis (scale bar, 1 nm), with insets in FIGS. 8a and b showing the crystal orientation and corresponding FFT, respectively; (c) Atomic model, simulated HAADF and ABF images of $Mo_3P$ in <111> zone axis; (d) Atomic model, simulated HAADF and ABF images of $Mo_3P$ in <110> zone axis. In all atomic models, Mo is shown as purple and P as orange spheres; (e) Electron energy loss spectroscopy (EELS) results of $Mo_3P$ crystals showing P L-edges; (f) Mo M-edges; (g) A LAADF image of $Mo_3P$ with EELS points and mapping signal collection regions highlighted (scale bar, 20 nm); and (h) An EELS mapping obtained from rectangle region in (g) showing spectrum image (SI), P, Mo, and RGB composite, respectively (scale bar, 2 nm).

To characterize the structural properties of synthesized materials and identify the type and physical properties of atoms at their surface and bulk structures, high-resolution scanning transmission electron microscopy (STEM) was performed. FIG. 2 a shows a low magnification high-angle annular dark field (HAADF) image of $Mo_3P$ crystal. The unit cell with lattice parameters of a=b=9.86 Å and c=4.85 Å is shown in FIG. 2b, corresponding to tetragonal crystal system of $I\bar{4}$ 2m space group. FIGS. 2c-d and FIGS. 8a-b show the STEM images of the $Mo_3P$ in two zone axes of <110> and <111>, respectively. Atomic model, as well as the HAADF and annular bright field (ABF) image simulations in these two zone axes are shown in FIGS. 8c-d, respectively. All Mo atoms in both zone axes are clearly resolved, while P atoms are also detectable in the ABF images. The good match among atomic model, simulated and experimental images confirms the tetragonal crystal structure of $Mo_3P$ nanoparticles. The STEM images also suggest that $Mo_3P$ has higher density of Mo atoms at the surface compared to other studied catalysts (section S3). The electronic properties of the atoms at the surface and bulk structures were also measured by core-loss electron energy loss spectrum (EELS). The EELS of P and Mo elements shown in FIG. 2e-f clearly resolved the P-$L_{2,3}$, P-$L_1$ as well as Mo-$M_{4,5}$ and Mo-$M_{2,3}$ edges. FIG. 2e shows the energy-loss near edge fine structure (ELNES) of P-$L_{2,3}$ edge collected at different distances from $Mo_3P$ (110) surface at the positions indicated by arrows in FIG. 8g. The pre-peak intensity at 134 eV (FIG. 2e) is correlated to transition from the P $2p_{3/2}$ initial states to the conduction band and inversely scales with the density of available charge carriers. Thus, decrease in the pre-peak intensity (FIG. 2e) shows a higher electron density at the $Mo_3P$ (110) surface. In addition, FIG. 2f shows ELNES of Mo-$M_3$ edge from (110) surface and bulk $Mo_3P$. The Mo-$M_3$ edge white-line indicates electron transition from $3p_{3/2}$ to s, d orbitals. A slightly red shift of $Mo_3P$ (110) surface compare to bulk $Mo_3P$ can be observed, as well as an increase of white-line intensity, suggesting that the Mo atoms in (110) surface that are likely responsible for electrocatalytic reactions have higher potential activity than Mo atoms in the bulk structure.

Figure 13:
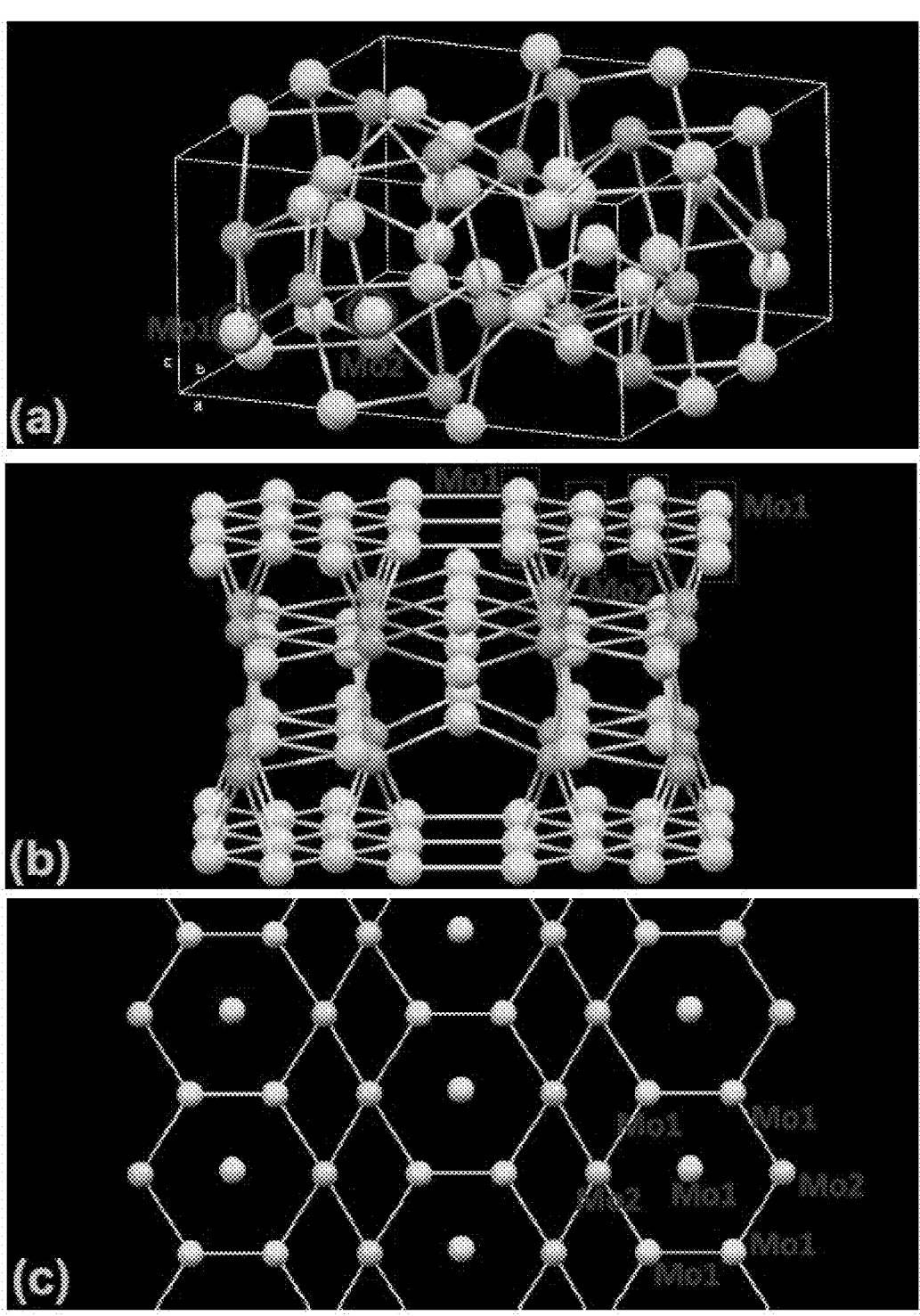
FIG. 13 shows: (a) $Mo_3P$ unit cell with Mo1, Mo2, Mo3, and P sites; (b) $Mo_3P$ (110) plane with all the atoms between the upper and lower (100) planes shown; and (c) $Mo_3P$ (110) plane with Mo1 and Mo2 sites with the Mo atoms directly below the $Mo_3P$ (110) plane at the center of the hexagons also shown.
Figure 14:
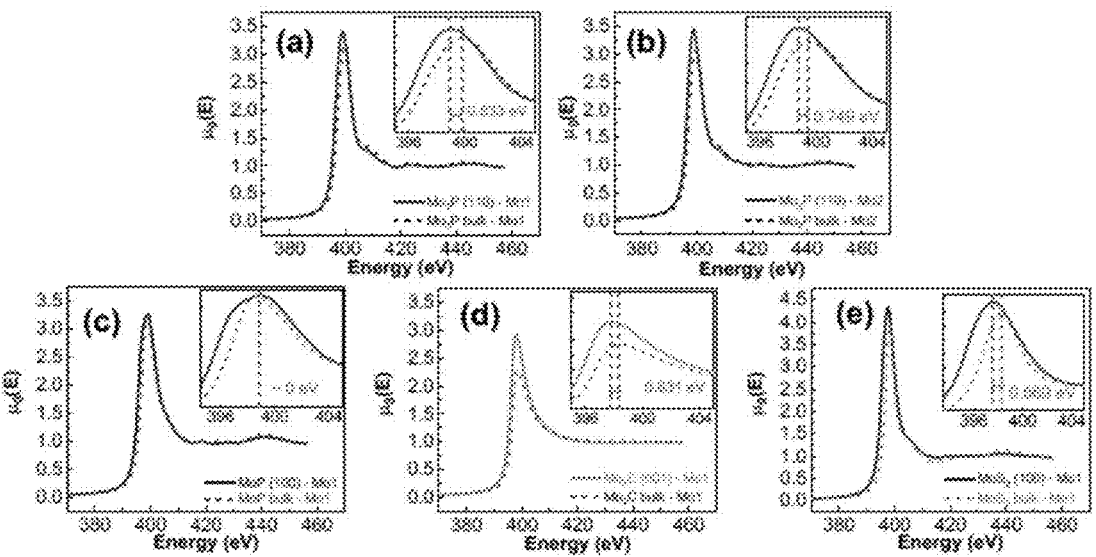
FIG. 14 shows XANES spectrum comparing bulk and surface structures with respect to $M_3$ absorption energy for: (a) $Mo_3P$ (110), Mo1 crystallographic site; (b) Mo2 crystallographic site; (c) MoP (100); (d) $Mo_2C$ (001); and (e) $MoS_2$ (100).

The x-ray absorption near edge structures (XANES) was calculated from the crystal structures of the synthesized materials and compared the relative positions and features of the absorption edges (FIG. 14). For $Mo_3P$ (110), both Mo1 and Mo2 crystallographic sites are exposed (FIGS. 13a-c) and thus the $M_3$ absorption edges were calculated independently (FIGS. 14a-b). As shown in FIGS. 14a-b, the comparison between bulk and surface states of both Mo1 and Mo2 crystallographic sites indicates that the line shifts to lower energy (0.833 eV and 0.749 eV, respectively), broadens and increases in peak height for $Mo_3P$ offering higher potential activity of Mo atoms at the surface (110) which is also consistent with ELNES results shown in FIG. 2f.

Figure 3:
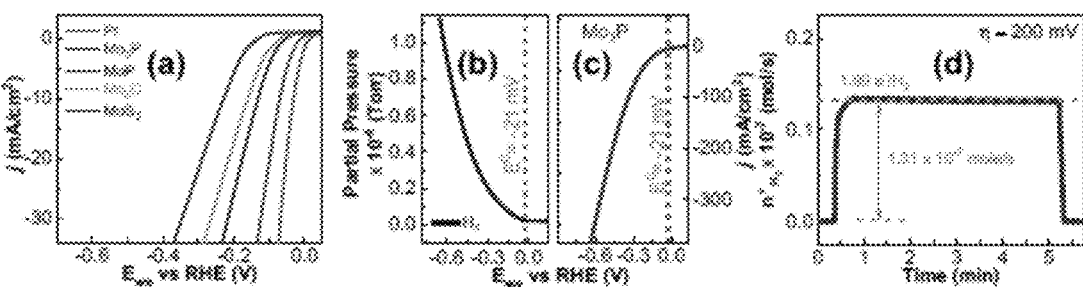
FIGS. 3A-D depict electrochemical performance of $Mo_3P$ nanoparticles.

Next, the electrocatalytic performance of the synthesized catalysts was studied for HER. FIG. 3a shows the iR-corrected cyclic voltammetry (CV) results of the synthesized nanostructured catalysts i.e., $Mo_3P$, MoP, $Mo_2C$ and $MoS_2$ compared with Pt, known to be the best HER catalyst. The amount of the coated catalyst on the electrode was precisely controlled to be 0.5 mg coated on the glassy carbon working electrode with the surface area of 1 $cm^2$. All experiments were performed under identical electrochemical conditions in 0.5M $H_2SO_4$ electrolyte and a controlled flow of ultra-high purity $H_2$ (section S5).

As shown in FIG. 3a, $Mo_3P$ nanoparticles exhibits remarkably low onset overpotential of 21 mV vs. RHE (All potentials in this study are presented with respect to reversible hydrogen electrode). In contrast, HER takes place at higher overpotentials of 63, 82 and 144 mV for MoP, $Mo_2C$ and $MoS_2$ NFs, respectively. The results indicate more than three, four, and seven-fold enhancement in the onset potential of $Mo_3P$ catalyst compared to other catalysts studied in this work. Moreover, a current density of −10 mA/cm$^2$ is achieved at 69 mV overpotential for $Mo_3P$. Furthermore, the corresponding recorded overpotentials for MoP, $Mo_2C$ and $MoS_2$ NFs in this study are 1.9 (130 mV), 2.3 (159 mV), and 3.3 (228 mV) times higher than that of $Mo_3P$ (69 mV), respectively, suggesting the superior catalytic activity of the $Mo_3P$ catalyst.

In-situ differential electrochemical mass spectroscopy (DEMS) was performed to precisely identify the HER onset overpotential for the $Mo_3P$ catalyst. The results indicate that $H_2$ partial pressure variation (FIG. 3b) follows the same trend observed for CV plot (FIGS. 3b-c). The results indicate that $Mo_3P$ has an onset potential of as low as 21 mV. The average value of 23±2 mV was measured for this catalyst the density of surface Mo sites that is the number of surface Mo sites divided by the area of the surface unit cell (See Table 2). It is worth noting that the measurements indicate that the density of Mo atoms in the active surface of $Mo_3P$ nanoparticles is about 12 atoms/nm$^2$ about two times greater than MoP (6 atoms/nm$^2$), $Mo_2C$ (8 atoms/nm$^2$), and $MoS_2$ (7 atoms/nm$^2$) nanoflakes, respectively. The results shown in FIG. 20 indicate that TOF, the actual Mo atom activity, for $Mo_3P$ is about 2.5 and 7.8 times greater than MoP and $Mo_2C$ at 100 mV overpotential, respectively, while the $MoS_2$ catalyst remains inactive at this overpotential (section S8). At an overpotential of 200 mV the TOF of $Mo_3P$ (4.12 s$^{-1}$) is about 5.3-fold more than $MoS_2$ NFs (0.77 s$^{-1}$). The TOF results confirm the remarkable catalytic activity of $Mo_3P$ for HER over the entire range of studied overpotentials (100-300 mV).

TABLE 2

| Catalyst | Flat Standard Capacitor (μF/cm$^2$) | No. of Mo atoms for flat standard capacitor | Double Layer Capacitor (mF/cm$^2$) | Roughness Factor (RF) | No. of Mo atoms per cm$^2$ |
|---|---|---|---|---|---|
| $MoS_2$ | 60 | 6.65 × 10$^{14}$ | 2.11 | 35.16 | 2.33 × 10$^{16}$ |
| $Mo_2C$ | 60 | 8.06 × 10$^{14}$ | 2.49 | 41.50 | 3.34 × 10$^{16}$ |
| MoP | 60 | 5.58 × 10$^{14}$ | 2.71 | 45.16 | 2.52 × 10$^{16}$ |
| $Mo_3P$ | 60 | 11.89 × 10$^{14}$ | 2.41 | 40.16 | 4.77 × 10$^{16}$ | using four independent DEMS experiments (See Table 1). In addition, DEMS experiment was carried out to determine the number of electrons per mole of evolved $H_2$. Measurements, shown in FIG. 3d, indicate that the number of transferred electrons is 1.99 e$^-$/$H_2$ confirming all the generated current at an overpotential of 200 mV is consumed to produce $H_2$ using $Mo_3P$ nanoparticles (section S6.2).

TABLE 1

| Experiment | Onset potential recorded using DEMS (mV) |
|---|---|
| 1 | 26 |
| 2 | 21 |
| 3 | 21 |
| 4 | 24 |
| average | 23 ± 2 |

Figure 32:
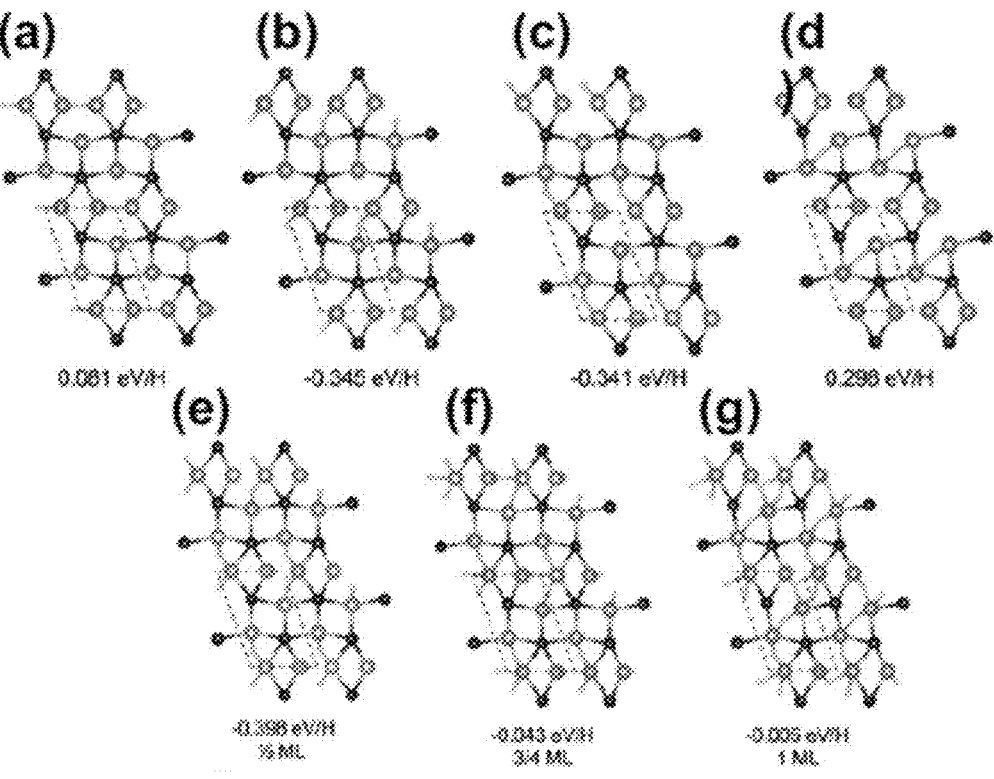
FIGS. 32A-D show a top view of hydrogen adsorption on $Mo_3P$ (110) at ¼ ML coverage. The top layer atoms are shown for clarity.
FIGS. 32E-G shows a top view of hydrogen adsorption on $Mo_3P$ (110) at higher coverages.
Figure 33:
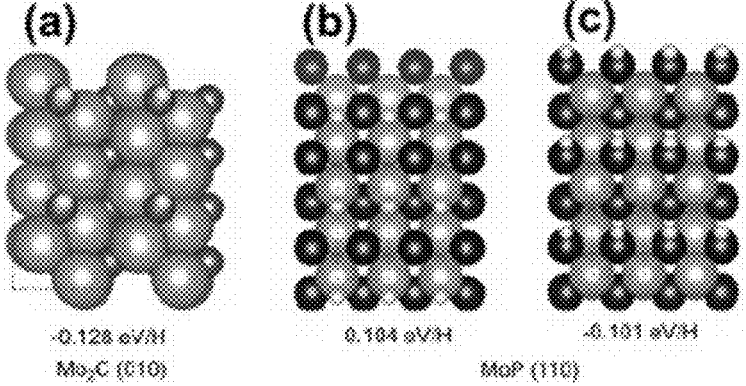
FIG. 33 shows a top view of hydrogen adsorption on: (a) $Mo_2C$ (001) and (b-c) MoP (100) correspond to two different adsorption sites; (b) Mo sites; and (c) P sites. The hydrogen adsorption free energies are listed. The dashed lines show the surface unit cell.
Figure 34:
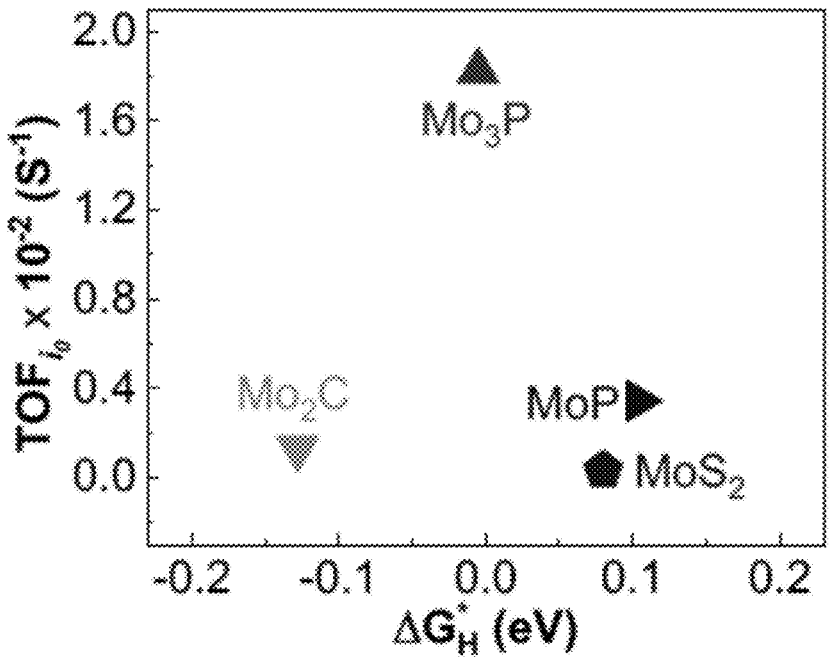
FIG. 34 shows a turnover frequency (TOF) at exchange current density of the $Mo_3P$, MoP, $Mo_2C$ and $MoS_2$ with respect to DFT-calculated Gibbs free energy of adsorbed hydrogen atoms.

The product formation rate normalized to the catalyst mass loading per unit surface area (0.5 mg/cm$^2$, section S7) is presented in FIG. 4a, comparing the molar quantity of $H_2$ formation (mol/s·g$_{cat}$) for each synthesized catalyst i.e., $Mo_3P$ nanoparticles, MoP, $Mo_2C$, and $MoS_2$ NFs. The results show that at an overpotential of 100 mV, $H_2$ is formed at a rate of about 214.7 μmol/s·g$_{cat}$ for $Mo_3P$ nanoparticles, approximately 4.7 times higher than for MoP (45.7 μmol/s·g$_{cat}$). The product formation rate for $Mo_3P$ nanoparticles is also more than 11.2 times greater compared to $Mo_2C$ NFs (about 19.1 μmol/s·g$_{cat}$) while $MoS_2$ NFs are inactive for HER at this potential. At an overpotential of 150 mV the $H_2$ formation rate of $Mo_3P$ nanoparticles (424.7 μmol/s·g$_{cat}$) is about 44-fold higher than $MoS_2$ NFs (9.6 μmol/s·g$_{cat}$). FIG. 4a also illustrates that $H_2$ formation rate is considerably higher for $Mo_3P$ nanoparticles over the entire range of overpotentials. The intrinsic catalytic activity of Mo atoms for the synthesized catalysts can be obtained by calculating turnover frequencies (TOF), per molybdenum atom activity, using the roughness factor (RF) method. (section S8). For all the catalysts, calculated TOFs are normalized considering The HER mechanism was also studied using Tafel plots for each synthesized catalyst. FIG. 4b presents measured Tafel slopes and exchange current densities of our synthesized catalysts based on iR-corrected CV results (FIG. 32a). As shown in FIG. 4b, a Tafel slope of 38 mV/dec was observed for $Mo_3P$ nanoparticles proposing the Heyrovsky step (electrochemical desorption) as a rate-determining step (RDS) for the HER. Tafel slopes of 44, 48 and 57 mV/dec are measured for MoP, $Mo_2C$, and $MoS_2$, respectively. As shown in FIG. 4b, $Mo_3P$ nanoparticles also show an exchange current density of 279.07 μA/cm$^2$ that is more than two orders of magnitude greater than the $MoS_2$ NFs (2.52 μA/cm$^2$) used in this study (See Table 3). In addition, the recorded exchange current density for $Mo_3P$ (279.07 μA/cm$^2$) is approximately 10, 19.5-fold greater than MoP (27.83 μA/cm$^2$) and $Mo_2C$ (14.27 μA/cm$^2$), respectively. The calculated lower Tafel slope (38 mV/dec) and the considerably higher exchange current density (279.07 μA/cm$^2$) suggest outstanding intrinsic electronic properties of the $Mo_3P$ catalyst compared to the other catalysts.

TABLE 3

| catalyst | Intercept at η = 0 | Exchange current density A/cm$^2$ |
|---|---|---|
| $Mo_3P$ | −3.554 | 279.07 × 10$^{-6}$ |
| MoP | −4.555 | 27.83 × 10$^{-6}$ |
| $Mo_2C$ | −4.845 | 14.27 × 10$^{-6}$ |
| $MoS_2$ | −5.598 | 2.52 × 10$^{-6}$ |

Figure 20:
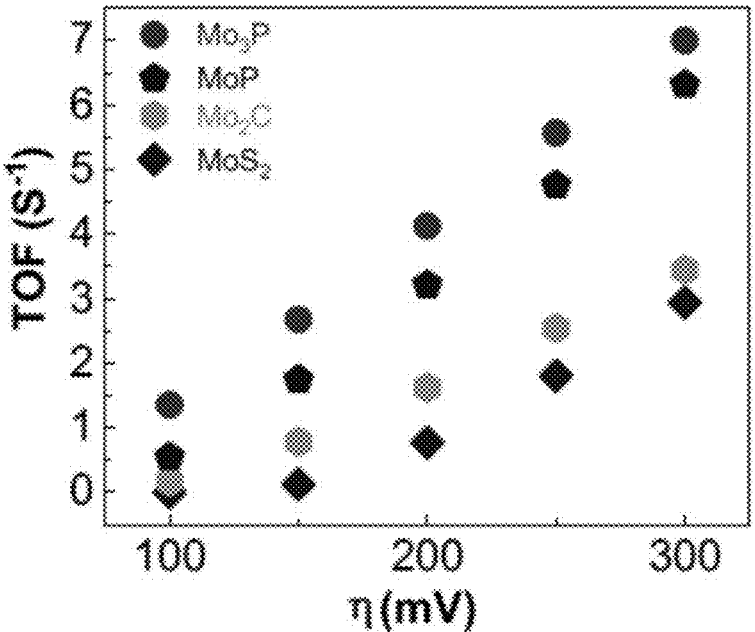
FIG. 20 shows Turnover Frequencies measurements at overpotentials from 100 to 300 mV.

To investigate the charge transfer properties in the studied catalysts, electrochemical impedance spectroscopy (EIS) was performed to measure the charge transfer resistance ($R_{ct}$) of each catalyst system. The experiments were performed at an overpotential of 200 mV to ensure that HER takes place. FIG. 4c shows the Nyquist plots of the synthesized catalysts for which a basic Randles circuit model is used to calculate $R_{ct}$ of each catalytic system. $Mo_3P$ shows a low $R_{ct}$ value of 17.2 Ω that is about 6 times lower than that of $MoS_2$ (102$\Omega$). The charge transfer values for MoP and $Mo_2C$ are 32, and 54$\Omega$, two and three times higher than $Mo_3P$, respectively. the work function values for $Mo_3P$ and MoP catalysts were also measured using ultraviolet photoelectron spectroscopy (UPS) (section S10). As shown in FIG. 20, $Mo_3P$ exhibits considerably lower work function (3.45 eV) than MoP (3.75 eV), $Mo_2C$ (3.92 eV) and $MoS_2$ (4.1 eV). These results confirm that the superior catalytic activity of $Mo_3P$ is mainly due to ultra-fast electron transfer (FIG. 4c) and lower work function (FIG. 21) compared to the other studied catalysts.

The cycle stability of the $Mo_3P$ catalyst was also evaluated using CV experiment (section S11). FIG. 4d compares the performance of $Mo_3P$ catalyst after 1000 cycles and the first cycle. As shown in this figure, a negligible change of the overpotential (3.0 mV) is observed after 1000 cycles to reach the current density of −10 mA/cm$^2$, offering high stability of $Mo_3P$ catalyst (section S11). Additionally, the long-term stability of the $Mo_3P$ catalyst was also studied by performing a chronoamperometry (CA) experiment at an overpotential of 200 mV (section S11). The CA experiment result shown in the inset of FIG. 4d, indicates that the current density (about −34 mA/cm$^2$) remains constant over 40 hours with a negligible loss (9.2%) suggesting remarkable stability of the $Mo_3P$ catalyst for HER. The XPS results after and before CA experiment also confirm the stability of $Mo_3P$ catalyst after 40 hours long-term experiment (section S11)

Figure 5:
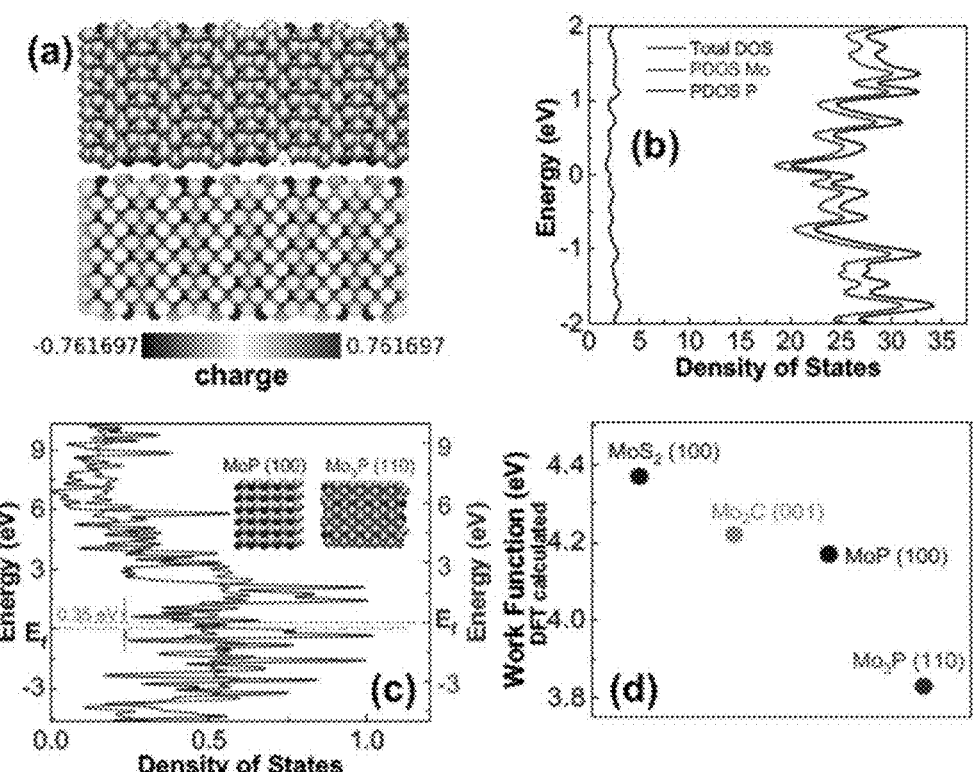
FIGS. 5A-D depict computational study of $Mo_3P$ catalyst.

A comparative theoretical study was performed to identify the origin of the HER catalytic activity of $Mo_3P$, MoP, $Mo_2C$, and $MoS_2$ catalysts (section S13). Given the complexity of the actual HER in the aqueous acidic environment, the difference in electronic structures of these materials was studied. Motivated by experimental results (HAADF of nanoflakes of MoP and $Mo_3P$), (110), (100), (001), and (100) slabs of $Mo_3P$ (I42m), MoP (P6m2), $Mo_2C$ (Pbcn), and $MoS_2$ (P63/mmc) were used as a model, respectively. The optimized unit cells of $Mo_3P$, MoP, $Mo_2C$, and $MoS_2$ used in simulations are shown in FIGS. 26a-h. To evaluate redistribution of charges between Mo and P (C in $Mo_2C$ and S in $MoS_2$) across the slabs, Bader charge analysis were performed which is free from the drawback of the Mulliken charges known to strongly depend on the basis set. As shown in FIG. 27a, the charge distribution for MoP (100) is more or less homogenous for each type of atom. The average charge on the Mo— atom is ca. +0.62 and the average charge on the P-atom is −0.62 meaning that the phosphorus is the charge acceptor with strong degree of iconicity of the Mo—P bonds. $Mo_3P$ is a less phosphorinized version of MoP and the charge is distributed less evenly as shown in FIG. 5a. The average charge on Mo-atoms is ca. +0.24 and the average charge on P-atoms is ca. −0.72. Importantly, some of the surface Mo-atoms are heavily reduced, presumably contributing significantly to the catalytic activity of the $Mo_3P$ (110) surface. As for the $Mo_2C$ (001) shown in FIG. 27b, the topmost (001) layer of $Mo_2C$ contains Mo-atoms with Bader charges of +0.51 whereas Mo-atoms in the bulk regions are more oxidized as indicated by their charges of +0.75. C-atoms belonging to the top layer are less reduced (Bader charges −1.15) as compared to those in the bulk (Bader charges −1.35). In addition, as shown in FIG. 27c, surface of $MoS_2$ (100) is made of alternating layers with exposed (under-coordinated) Mo-atoms and Mo-atoms fully coordinated with S-atoms. The average Bader charge on Mo-atoms was +1.04 and on S-atoms −0.52. However, the exposed Mo-atoms are more reduced bearing the charge of +0.85.

Figures 28, 29:
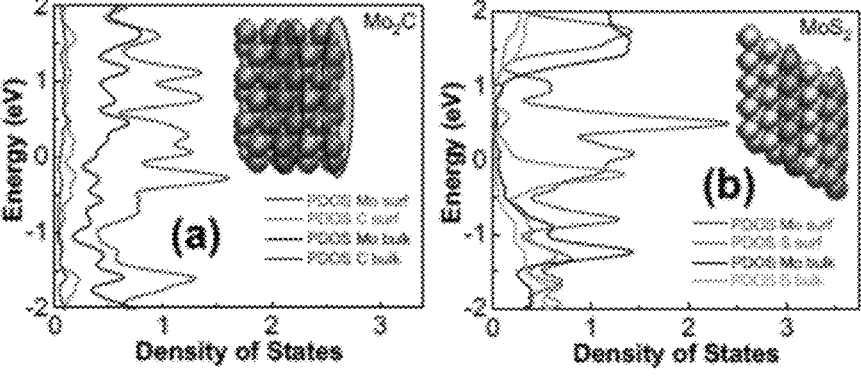
FIG. 28 shows a total and element projected densities of states for: (a) $Mo_3P$ (110), (b) MoP (100), (c) $Mo_2C$ (001) and (d) $MoS_2$ (100) slabs. Layers resolved Mo-projected DOS for (e) $Mo_3P$ (110), and (f) MoP (100) slabs (g) $Mo_2C$ (001) slabs and (f) $MoS_2$ (100) slabs where DOS are normalized by number of Mo-atoms in each layer.
FIG. 29 shows layers and elements resolved PDOS for: (a) $Mo_2C$ (001) slab and (b) $MoS_2$ (100) slab. DOS are normalized by number of Mo- and S and C-atoms in each layer.

Next, the density of states for $Mo_3P$, MoP, $Mo_2C$ and $MoS_2$ catalysts analyzed. FIG. 5b show the total and element projected density of states (DOS) for $Mo_3P$. The total and element projected DOS for MoP, $Mo_2C$, and $MoS_2$ are shown in FIGS. 28b-d, respectively. As shown in these figures, both $Mo_3P$ (110) and MoP (100) slabs are metallic with dominating Mo d-states at the Fermi energy level. However, there is a significant difference between (Mo—terminated) slabs of $Mo_3P$ (110) and MoP (100), respectively FIGS. 28e-f. As shown in FIG. 28e, Mo-atoms on the surface layer of $Mo_3P$ (110) have higher DOS than those in the bulk (at the Fermi energy level), which shows their higher potential activity. However, there is not much difference between surface layers of Mo-atoms and those in the middle of the slab (bulk) for MoP (100) (FIG. 28f). A similar analysis was also performed for $Mo_2C$ and $MoS_2$ catalyst (FIGS. 28c, d, g, h, and 29). FIG. 28c indicates that Mo states of $Mo_2C$ dominate at the Fermi energy level. The contribution of the surface and bulk-like Mo- and C-atoms are also shown in FIG. 28g. As shown in this figure, the DOS (at the Fermi level) of surface layer dominates over the DOS of the layers in the bulk. The analysis of DOS (PDOS) for $MoS_2$ shows that the slab is metallic, and the surface layers dominate the density of states at the Fermi energy level (FIGS. 28d and h). To further discern the relative contributions from Mo and C atoms in $Mo_2C$ and Mo and S atoms in $MoS_2$, PDOS of surface and bulk-like layers for each element was computed (FIGS. 29a-b). FIG. 29a for $Mo_2C$ shows the contribution from the Mo and C atoms in the surface and bulk-like layers of the slab indicating that Mo surface states dominate at the Fermi level whereas the contributions from elements in the bulk regions are less important. As for the $MoS_2$, shown in FIG. 29b, this analysis shows that Mo surface states (1.26) are more dominant compared to S surface states (0.31) at the Fermi energy level whereas the contributions from these elements in the bulk regions are nearly negligible.

Figure 21:
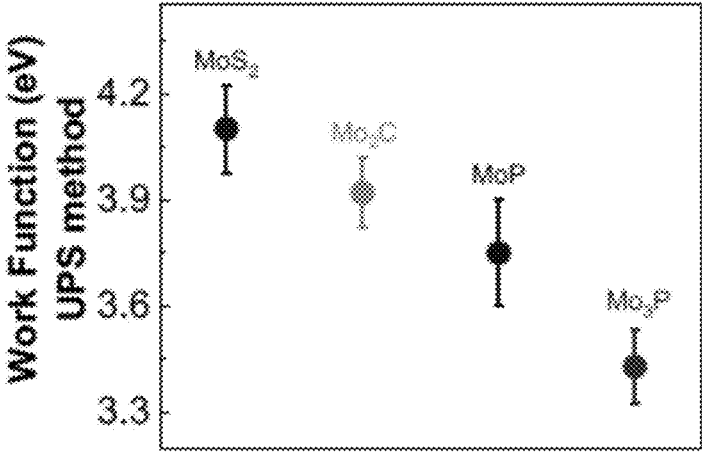
FIG. 21 shows work function measurements for $Mo_3P$ and MoP catalysts with Error bar for each measurement. $Mo_3P$ has the lowest work function, 3.45 eV, compared to that of MoP (~3.75 eV), $Mo_2C$ (~3.92), and $MoS_2$ (~4.1 eV).
Figure 30:
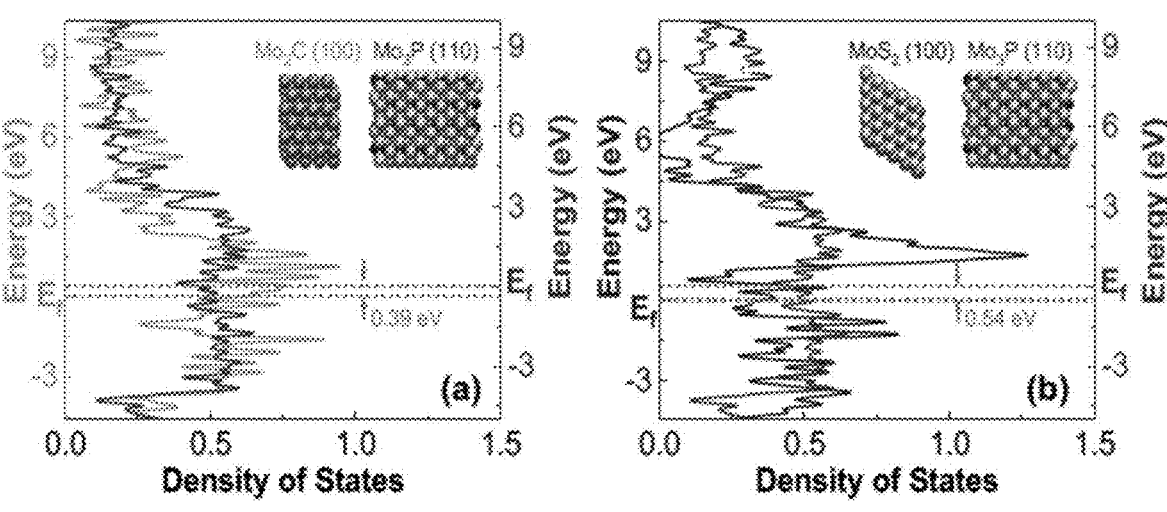
FIG. 30 is a comparison of Mo-PDOS: (a) for $Mo_3P$ (110) and $Mo_2C$ (001); and (b) for $Mo_3P$ (110) and $MoS_2$ (100) slabs showing 0.39 and 0.54 eV between their mutual fermi energy level positions, respectively.
Figure 31:
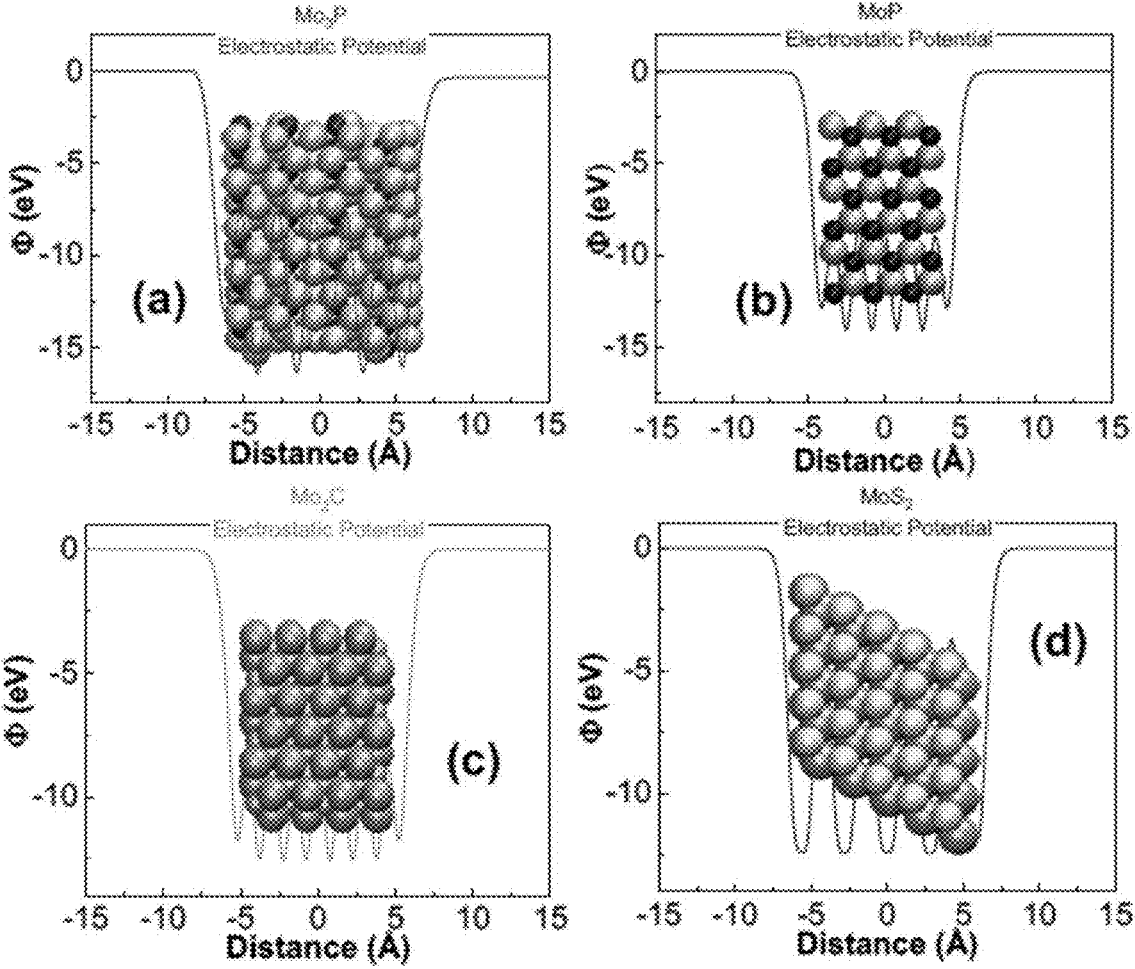
FIG. 31 shows Hartree Electrostatic potentials at the edges of the cell (z-direction) as a reference for the Fermi energy level for (a) $Mo_3P$ (110), (b) MoP (100), (c) $Mo_2C$ (001), and (d) $MoS_2$ (100) slabs.

In order to compare the electronic structures of these materials a comparative analysis of Mo-PDOS was done. As shown in FIG. 5c, the actual number of states is approximately the same for both $Mo_3P$ and MoP materials at the Fermi energy level. However, it was found that the Fermi energy level of $Mo_3P$ is 0.35 eV higher than that of MoP. The availability of electrons of $Mo_2C$ and $MoS_2$ is even lower since their work functions (FIG. 5d) are even larger 0.39 and 0.54 eV, respectively, as compared to that of $Mo_3P$ (FIGS. 30a-b). Furthermore, as shown in FIG. 5d, the work function measurement (FIGS. 31a-d) indicated a lower value for $Mo_3P$ (3.83 eV) compared to MoP (4.17 eV), $Mo_2C$ (4.22 eV) and $MoS_2$ (4.38 eV). There is also a relatively good match between DFT-calculated absolute work function values and experimental work function values obtained by UPS, as shown in FIG. 21 and FIG. 5d. This finding suggests that the Mo-states that are presumably responsible for the charge transfer are much more easily accessible for $Mo_3P$ than for MoP, $Mo_2C$ and $MoS_2$. This can potentially explain the observed difference in the HER overpotentials and the Tafel slopes for these materials.

Next, the hydrogen adsorption on the (110) surface of $Mo_3P$, (100) surface of MoP, and (001) surface of $Mo_2C$ (section S12.5) was considered. The computational results suggest that hydrogen does not bind the P sites in $Mo_3P$ (110); Instead, it tends to be stable at the bridging sites of Mo atoms. Calculations of $\Delta G_{H^*}$ at ¼ ML coverage (in terms of surface Mo atoms) indicate two strong binding bridging sites (FIGS. 26b-c), and one neutral binding (FIG. 26a) bridging site. Compared to the Mo—Mo distance of about 2.7 Å for these bridging sites, the much longer Mo—Mo distance (3.1 Å) in FIG. 26*d* created a weak binding site. At coverages below ½ ML, hydrogen binds the strong binding sites, with a $\Delta G_{H^*}$ of −0.398 eV/H at ½ ML. Additional hydrogen atoms will then occupy the neutral binding sites on the surface. The $\Delta G_{H^*}$ is −0.043 eV/H at ¾ ML coverage, suggesting the Mo₃P surface becomes active for HER. Strong surface atom relaxations at high H coverages can further change the local environment for hydrogen adsorption. At 1 ML H coverage, the Mo—Mo distance of the weak binding site is reduced to 2.9 Å. Meanwhile, the Mo₃P (110) surface achieves an almost neutral $\Delta G_{H^*}$ at 1 ML coverage.

Figure 6:
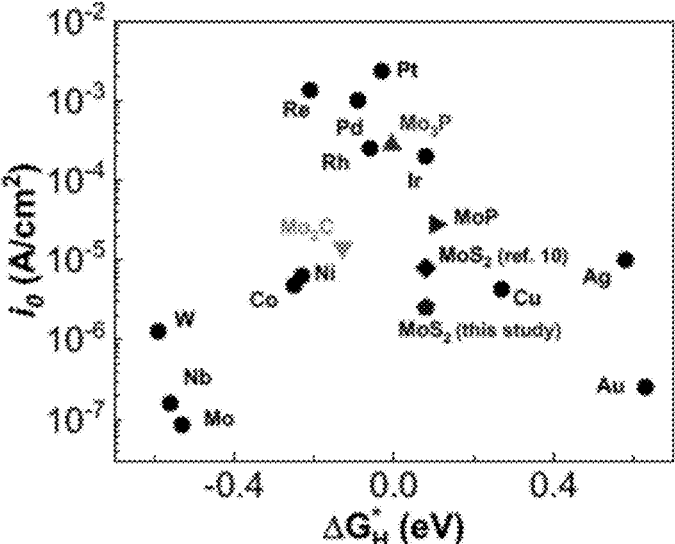
FIG. 6 depicts HER volcano plot: exchange current density of the $Mo_3P$, MoP, $Mo_2C$ and $MoS_2$ with respect to DFT-calculated Gibbs free energy of adsorbed hydrogen atoms in a volcano plot. The $Mo_3P$ (110) surface show an almost neutral $\Delta G_{H^*}$ and 279.07 $\mu A/cm^2$ exchange current density exceeding the performance of existing none-noble metal catalysts. The $MoS_2$ exchange current density and Gibbs free energy are extracted from literature.

FIG. 6 also shows exchange current densities with respect to the DFT-calculated Gibbs free energy ($\Delta G_H^*$) of H adsorption for Mo₃P, MoP, Mo₂C and MoS₂ (extracted from FIG. 3*b*) as well as other pure metals. The performance of the Mo₃P catalyst surpassed the activity of existing none-noble metal catalysts for HER.

In summary, nanostructured Mo₃P, MoP, Mo₂C, and MoS₂ can be synthesized as non-precious metal catalysts using a facile and scalable colloidal chemistry method and then tested for HER, a reaction mainly catalyzed by precious metals. Cyclic voltammetry and in-situ differential electrochemical mass spectroscopy results reveal that the Mo₃P catalyst illustrates an onset potential of 21 mV, which is remarkably lower than existing non-precious metal catalysts and the closest value to Pt. Furthermore, H₂ molar quantity calculation normalized per catalyst mass loading per unit surface area for Mo₃P catalyst indicates 44-fold higher formation rate compared than that of MoS₂ at an overpotential of 150 mV. The chronoamperometry and CV results also confirmed the stability of the Mo₃P catalyst having a negligible loss (about 9.2%) after 40 hours continuous process as well as only 3 mV change in η10 mA/cm²=72 mV after 1000 cycles, respectively. The DFT calculations indicate that the Mo-states are much more easily accessible for Mo₃P than for MoP, Mo₂C and MoS₂. The results also show that the low onset overpotential of Mo₃P is mainly attributed to the lower work function of Mo₃P. It was also determined that the hydrogen adsorption on the low-energy (110) surface of Mo₃P, suggesting the adsorption of hydrogen to bridging sites of Mo instead of P sites with neutral ideal free energy of Gibbs ($\Delta G_H^*$=0) at above ½ ML hydrogen coverage of (110) surface leading to high catalytic activity of Mo₃P that is among the closest values to Pt. The demonstrated catalyst in this study, offers a new generation of non-precious metal catalysts in the advancement of effective sustainable technologies for current and future energy needs.

Experimental Section

Catalyst preparation: In a custom-made liquid exfoliation method, the bulk of the synthesized materials, as discussed in section S1.3, were processed with an ultrasonic liquid processor to obtain Mo₃P nanoparticles as well as MoP and Mo₂C nanoflakes. MoS₂ nanoflakes were also prepared using the same liquid exfoliation process of the commercial bulk powder (MoS₂, Sigma-Aldrich, 99%), Basically, 300 mg of the bulk powder was dispersed in 60 mL isopropanol using the sonication probe for 20 hrs. The solution was further centrifuged at 2000 rpm for one hour and the supernatant of the solution was collected and stored in a vial.

Electrochemical experiments: A custom-made glassy carbon electrode was coated (working electrode) using the obtained nanoparticles/nanoflakes solution of the catalysts surface by drop casting method. The amount of the coated catalyst on the electrode was precisely controlled to be 0.5 mg/cm². All the electrochemical experiments were performed in a three-electrode electrochemical cell where the electrolyte was 0.5M sulfuric acid (H₂SO₄). During all the electrochemical experiments, H₂ (UHP 99.99%) was bubbled in the electrolyte. 52-mesh Pt gauze and 3M Ag/AgCl electrode were used as the counter and the reference electrode, respectively. In the same setup, reference electrode was calibrated with respect to the reversible hydrogen electrode (RHE) where Pt gauze was used for both counter and the working electrode, resulting in 0.230 V shift vs. RHE. The potential was swept from 0 to −1.0 V vs. Ag/AgCl electrode at the scan rate of 50 mV/s. The pH of the electrolyte was also measured before and after the CV experiments. The average measured pH of the electrolyte was approximately 0.35.

In-situ differential electrochemical mass spectroscopy (DEMS) experiments: The membrane inlet mass spectrometer (MIMS) was used to determine the onset potential and the number of electron transfer for HER using Mo₃P catalyst. The experiments were performed in a custom-made sealed two-compartment three-electrode cell. The cell was under ultrahigh-vacuum pressure (1×10⁻⁸ Torr) during the experiment. A cyclic voltammetry experiment was performed by sweeping the potential from 0.0 to −1.0 V vs. Ag/AgCl with the scan rate of 50 mV/s. The cathode compartment of the cell was separated from the anode using an anion exchange membrane and the evolved hydrogen at the cathode was transferred to the mass spectroscopy device once generated due to the ultra-high vacuum.

Computational details: A comparative theoretical study was used to further elucidate the origin of intrinsic electronic property of Mo₃P, MoP, and MoS₂ catalyst using HAADF images of (110), (100), and (100) slabs, respectively. First, the optimization of the atomic structures of both slabs was performed. All the slabs were neutral (stoichiometric compositions were used). For the Mo₃P (110) slab, a cell containing 48 Mo and 16 P atoms was used whose dimensions are 1×1×2 unit cells. For the MoP (100) slab, a 5×3 unit cell with three layers was used as a suggested minimum. The cell size is 16.035×16.78878×32 Å³ and contains 90 Mo and 90 P atoms. For the MoS₂, a slab with dimensions of 5×5×2 unit cells was used which contains 100 Mo and 200 S atoms. A model (001) slab of Mo₂C was also used, represented by 3×3×2 unit cell of Mo₂C (Pbcn) where the slab unit cell of Mo₂C contained 216 atoms (144 Mo and 72 C, stoichiometric composition) and the size of the unit cell is 14.2503× 15.603×48 Å³. The surface perpendicular dimension is 48 Å. These sizes exclude mutual interactions between images in the periodic boundary conditions. The density functional theory (DFT) was employed to perform all quantum mechanical calculations as implemented in the SIESTA package. The study used PBE functional with the DZP atomically localized basis set and norm-conservative pseudopotential with the cutoff energy of 400 Ry. The Brillouin zones of the unit cells were sampled by the Monkhorst-Pack grid with the k-point grid 5×5×1. Geometry optimization was carried out using the conjugate gradients algorithm until all the forces were less than 0.04 eV/A and the stress in the periodic direction was smaller than 0.01 GPa.

In addition, first-principles calculations were performed to study the adsorption of hydrogen atoms on the surfaces of Mo₂C, MoP, and Mo₃P. The catalytic surfaces are modeled by slab models with atomic layers of at least 15 Å in thickness and a 15 Å vacuum spacing. The lateral dimensions of the slabs are fixed at equilibrium bulk sizes, but all internal coordinates are allowed to relax until forces on each atom are below 0.01 eV/A. The surface energies of low-index catalytic surfaces are calculated, and the atomic hydrogen adsorptions are investigated on the lowest-energy surface termination of the catalysts. The calculations are based on DFT as implemented in the Vienna ab initio Simulation Package (VASP) using the projector-augmented wave (PAW) method. The generalized gradient approximation (GGA) of Perdew-Burke-Ernzerhof (PBE) is used to approximate the electronic exchange and correlation. The energy cutoff for the plane wave basis set of the electronic wave functions is 520 eV. The Brillouin-zone integrations are sampled using gamma-centered Monkhorst-Pack k-point meshes corresponding to an m×n×1 grid with at least 2000 k-points per reciprocal atom (KPPRA). For more details, please refer to the section S13.

S1. Materials Synthesis

S1.1. Tri-Molybdenum Phosphide and Molybdenum Phosphide Synthesis

Tri-molybdenum phosphide ($Mo_3P$) and molybdenum phosphide (MoP) were synthesized using sol-gel process followed by a two-step thermal sintering method. Ammonium molybdate tetrahydrate (($NH_4)_6Mo_7O_{24}\cdot4H_2O$, Sigma-Aldrich, Bioultra, >99.0%), diammonium phosphate dibasic (($NH_4)_2HPO_4$, Sigma-Aldrich, ACS reagent, >98.0%), and citric acid ($C_6H_8O_7$, Sigma-Aldrich, ACS reagent, >99.5%) were mixed in specific molar ratios, 1:3:6 for $Mo_3P$ and 1:1:2 for MoP, respectively, and dissolved in sufficient amount of DI-water to obtain the initial mixture of the precursors. The non-colored mixture was then heated and stirred at 90° C. for overnight to allow enough time for the reaction. The color of the mixture changed first to yellow and ends up with a milky white color when the reaction is complete. The mixture was further dried at 120° C. in a vacuum oven to evaporate the excess water and the resulting sludge was then ground to a fine powder in a mortar. A dual zone tube furnace, for close temperature control, was used to sinter the powder, scattered in a quartz crucible, at 500° C. (heating rate of 10° C./min) under controlled $N_2$ flow for 6 hrs. The obtained dark gray powder was then uniformly dispersed in a quartz crucible and heated to 850° C. at the heating rate of 10° C./min and kept at 850° C. for 2 hrs under controlled flow of Argon/$H_2$ (8% $H_2$) to obtain the desired catalysts.

S1.2. Molybdenum Carbide Synthesis

Molybdenum carbide ($Mo_2C$) catalyst was obtained by mixing phosphomolybdic acid hydrate ($H_3P(Mo_3 O_{10})_4\cdot xH_2O$, Sigma-Aldrich, ACS reagent) and carbon black (Vulcan XC-72R, FueCellStore, 50 nm particle size) in molar ratios of 2:1 and dissolved in DI water. The mixture was then heated and stirred at 90° C. for a day. Once dried in the vacuum oven at 120° C., the sludge was ground to powder, dispersed in a quartz crucible, and transferred to the tube furnace for further thermal sintering. The sample was heated up to 800° C. at the heating rate of 10° C./min and kept at 800° C. for 4 hrs under controlled flow of Argon to obtain the $Mo_2C$ catalyst.

S1.3. Synthesis of Nanoparticles and Nanoflakes of the Catalysts

In a custom-made liquid exfoliation method, the bulk of the synthesized catalysts were processed with an ultrasonic liquid processor (Sonics VibraCell VCX-130) to obtain $Mo_3P$ nanoparticles as well as MoP and $Mo_2C$ nanoflakes. $MoS_2$ nanoflakes were also synthesized using the same liquid exfoliation process of the commercial bulk powder ($MoS_2$, Sigma-Aldrich, 99%). Basically, 300 mg of the bulk powder was dispersed in 60 mL isopropanol using the sonication probe for 20 hrs. The solution was further centrifuged at 2000 rpm for 1 hr and the top two-third of the solution was collected and stored in a vial.

S2. X-ray Diffraction (XRD) Characterization

X-ray diffraction (XRD) patterns were collected by a Bruker D2 PHASER diffractometer in Bragg-Brentano geometry employing Ni filtered Cu Kα radiation. Patterns were obtained from 10 to 100° 2θ degree using a LynxEye linear position sensitive detector. A step width of 0.2° 2θ and a counting time of 10 s/step were used. All other parameters were chosen to enhance the signal to noise in the spectra. FIG. 7a presents the XRD pattern for $Mo_3P$ sample (ICDD 04-004-3005). XRD pattern of MoP nanoflakes is also shown in FIG. 7b in which peaks at 28°, 32°, 43° and 57° correspond to (001), (100), (101), and (110) crystal surfaces, respectively, confirming the crystalline structure of the synthesized material. In contrast to $Mo_3P$, cubic Mo metal rearranges to hexagonal structure, P6 m2 in MoP (ICDD 04-002-4743) where each Mo atom bonds with 6 P atoms.

The Scherrer Equation, Eq. 1, was employed to determine the $Mo_3P$ (110) crystallite size with respect to the peak at 13° degree in FIG. 7a. The Scherrer Equation is as follows where 'd' is the mean size of the ordered domain, 'K' is the dimensionless shape factor (K=0.98 for spheres), 'λ' is the X-ray wavelength (λ=0.158 nm for Cu X-ray tube), 'β' is the line broadening at half of maximum intensity in radians and θ is the Bragg angle (in radians).

$$d = \frac{K\lambda}{\beta \cos\theta} \qquad \text{(Eq. 1)}$$

The measured crystallite size for $Mo_3P$ and MoP was ~150 and ~75 nm, respectively.

S3. Scanning Transmission Electron Microscopy (STEM), Electron Energy Loss, Spectroscopy (EELS) and Multislice Image Simulation $Mo_3P$, $Mo_2C$, and MoP catalysts were characterized by drop casting dispersion solution on copper grid. High angle annular dark field (HAADF), low angle annular dark field (LAADF), and annular bright field (ABF) images were acquired by a spherical aberration corrected JEOL JEM-ARM 200CF STEM with a cold field emission gun operating at 200 kV, with 22 mrad convergence angle. Images were taken using an Orius CCD camera with 512×512 scanning resolution. Electron energy loss spectra (EELS) were acquired on a Gatan GIF Quantum spectrometer with an entrance aperture of 5 mm. Multislice image simulation was done using JEMS software with STEM probe and detector parameters identical to experimental condition.

S3.1. STEM/EELS Characterization of $Mo_3P$

The tilted sample at <111> zone axis is shown in FIGS. 8a-b. Atomic model, as well as the HAADF, and ABF image simulations for zone axes <111> and <110> are shown in FIGS. 8c-d, respectively. FIGS. 8e-f show the EELS analysis for $Mo_3P$ sample. The EELS mapping in FIG. 8f confirms the uniform chemical composition of P and Mo.

S3.2. STEM/EELS Characterization of MoP

Figure 9:
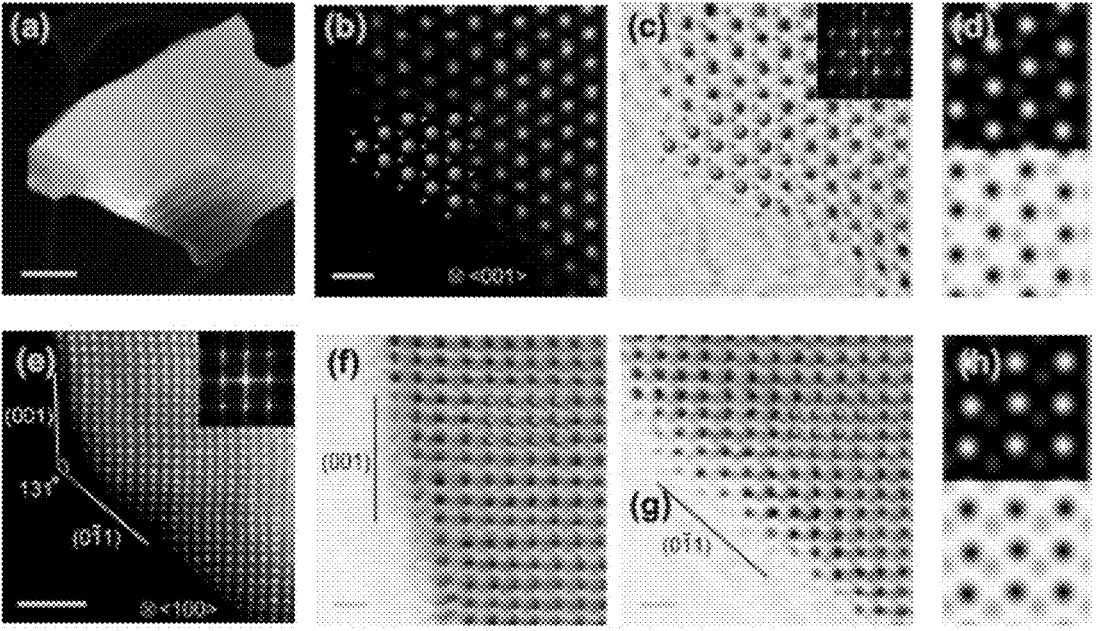
FIG. 9 shows: (a) Low magnification HAADF image of MoP flake (scale bar, 0.2 μm); (b) Atomic resolution HAADF (scale bar, 0.5 nm); (c) ABF images of MoP edge in <001> zone axis (scale bar, 0.5 nm), with insets showing the corresponding FFT, and the atomic model is overlaid with the images; (d) Simulated HAADF and ABF image of MoP in <001> zone axis; (e) Atomic resolution HAADF image of MoP edge in <100> zone axis (scale bar, 2 nm). Inset shows the corresponding FFT; (f) Atomic resolution ABF images of MoP (001) (scale bar, 0.5 nm); (g) shows (011) edges corresponding to (e) (scale bar, 0.5 nm), where the atomic model is overlaid with the images; and (h) Simulated HAADF and ABF image of MoP in <100> zone axis.

FIG. 9a shows the low-magnification layered structure of MoP nanoflakes. Atomic resolution HAADF and ABF images of <001> zone axis are shown in FIG. 9b-c. Due to the higher sensitivity of light elements in ABF image than the HAADF image, P atoms are clearer resolved in ABF images with a lighter contrast compare to Mo atoms. The corresponding Fast Fourier transform (FFT) image in inset of FIG. 9c shows a hexagonal structure of MoP crystal, similar to the well-studied $MoS_2$ (001) basal plane. The crystal model with lattice parameters of a=b=3.24 Å and c=3.20 Å in <001> zone axis is overlaid on FIGS. 9b-c, with Mo shown as purple and P as orange spheres, respectively. FIG. 9d shows the image simulation using the crystal model at same zone axis. The good match among model, experiment and simulated images confirms the hexagonal geometry of MoP crystal.

Figure 10:
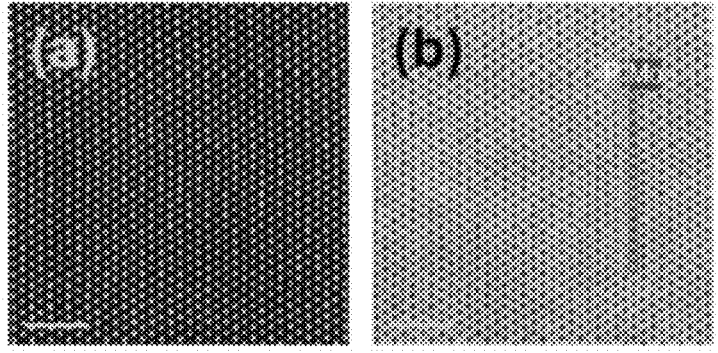
FIG. 10 shows: (a) HAADF and (b) ABF images of MoP flake at interior region in <001> zone axis.

The interior of MoP in <001> zone axis, shown in FIG. 10, indicates the uniform and high crystallinity of the obtained sample. Another low Miller index plane of (100) that corresponds to <100> zone axis is shown in FIGS. 9e-h. The two edges of (001) and (011), with an intersection angle of 131°, is shown in the HAADF image. ABF images in FIGS. 9f and g are zoomed-in regions focusing on the two edges. The overlaid crystal model combined with simulated HAADF and ABF image in FIG. 9 h further confirms the structure in <100> zone axis.

Figure 11:
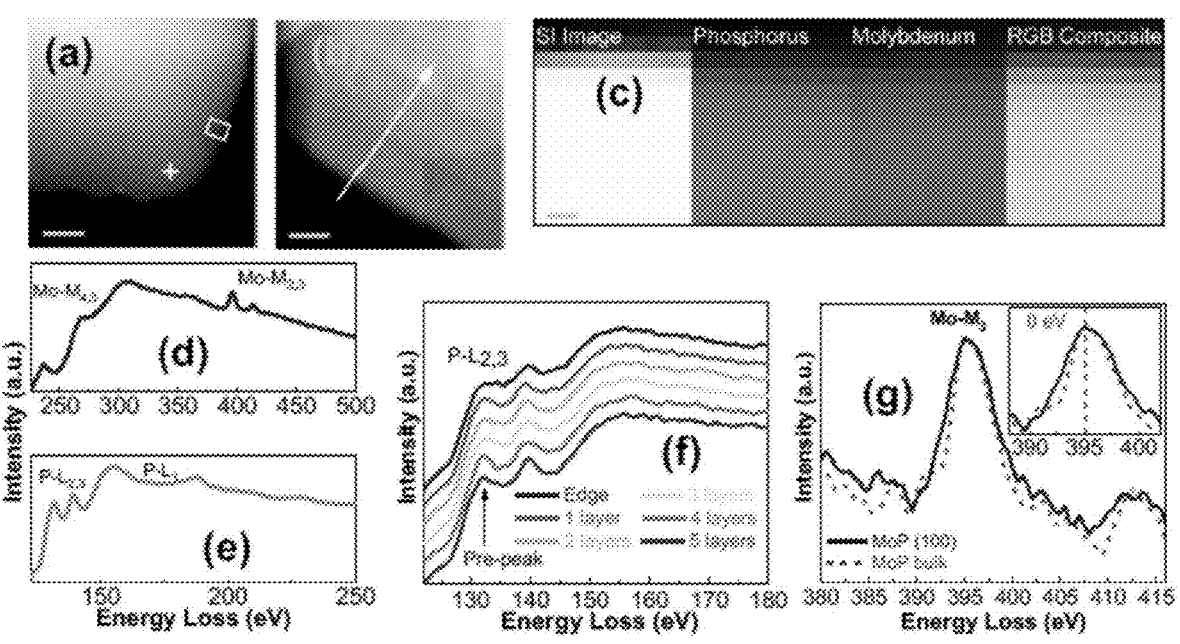
FIG. 11 shows: (a) A LAADF image of MoP flake with EELS point and mapping signal collection regions highlighted (scale bar, 20 nm); (b) A LAADF image of several layers of MoP flake (scale bar, 20 nm), with EELS line collection direction is highlighted by the arrow; (c) An EELS mapping obtained from rectangle region in (a) showing spectrum image (SI), P, Mo, and RGB composite, respectively (scale bar, 2 nm); (d) Core-loss EELS obtained at cross mark in (a) showing Mo-$M_{4,5}$, Mo-$M_{2,3}$ edges; (e) P-$L_{2,3}$, P-$L_1$ edges, respectively; (f) Core-loss EELS obtained from arrow region in (b) focusing on P-$L_{2,3}$ edge shows the evolution of $L_{2,3}$ pre-peak as a function of number of layers; and (g) ELNES of Mo-M3 edge from (100) surface and bulk of MoP.

FIG. 11 shows the EELS analysis for MoP sample. The EELS point, and mapping signal collection region are shown in LAADF image in FIG. 11a, and line collection is shown in FIG. 11b over different layers of MoP flake. The EELS mapping in FIG. 11c shows a uniform chemical composition of P and Mo elements. From core-loss EELS of P and Mo elements in FIGS. 11 d-e, the Mo-M$_{4,5}$ (227 eV), and Mo-M$_{2,3}$ minor edge (M$_2$ at 410 eV and M$_3$ at 392 eV) as well as the P-L$_{2,3}$ (132 eV), P-L$_1$ minor edge (189 eV) can be clearly distinguished. Line profile of P-L$_{2,3}$ edge in FIG. 11f shows the evolution of L$_{2,3}$ pre-peak across different number of layers.

S4. X-ray Absorption Near Edge Structure (XANES)

Figure 12:
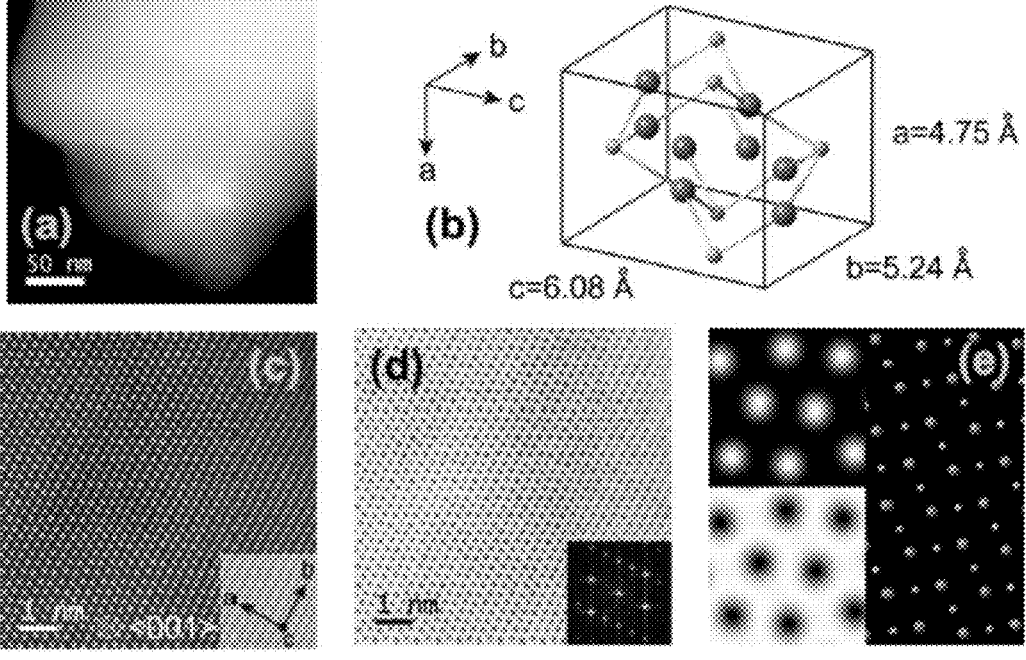
FIG. 12 shows: a) A HAADF image of $Mo_2C$ flake; (b) Unit cell of $Mo_2C$ with lattice parameters of a=4.75 Å, b=5.24 Å and c=6.08 Å; (c) (d) Atomic resolution HAADF and ABF images of $Mo_2C$ in <001> zone axis. Insets in c and d show the crystal orientation and corresponding FFT, respectively; and (e) Simulated HAADF and ABF images of $Mo_2C$ in <001> zone axis, and the atomic model used for simulation.

The x-ray absorption near edge structure (XANES) was calculated from the crystal structures of the synthesized materials and compared the relative positions and features of the absorption edges. As shown in FIGS. 12a-d, the M$_3$ absorption edges (3p$_{3/2}$→s, d) of molybdenum were calculated using FEFF8.40 for Mo$_3$P, MoP, and MoS$_2$ structures for atoms in the bulk and on the observed surfaces: (110) for Mo$_3$P, (100) for MoP, and (100) for MoS$_2$. In all cases, clusters of ~10 Å radius around the central Mo atom were generated for the bulk calculations followed by removal of ~½ of the atoms for the exposed surface calculations. For Mo$_3$P (110), Both Mo 1 and Mo 2 crystallographic sites are exposed and thus the M$_3$ absorption edges were calculated independently (FIGS. 12a-b). As shown in FIGS. 12a-b, the comparison between bulk and surface states of both Mo 2 and Mo 1 crystallographic sites indicates that the white line shifts to lower energy (0.910 eV and 0.833 eV, respectively), broadens and increases in peak height for Mo$_3$P offering higher potential activity of Mo atoms at the surface (110) that is also consistent with ELNES results discussed above. The results also confirm that Mo atoms have similar electronic properties in the observed surfaces of the other studied catalysts as shown in FIGS. 6c-d.

S5. Electrochemical Experiments Setup

A custom-made glassy carbon electrode was prepared (working electrode) by coating the obtained nanoparticles/nanoflakes solution of the catalysts surface using drop casting method. The amount of the coated catalyst on the electrode was precisely controlled to be 0.5 mg. All the electrochemical experiments were performed in a batch three-electrode electrochemical cell where the electrolyte was 0.5M sulfuric acid (H$_2$SO$_4$). During all the electrochemical experiments, H$_2$ (UHP 99.99%, Praxair) was bubbled in the electrolyte. 52-mesh Pt gauze and 3M Ag/AgCl electrode were used as the counter and the reference electrode, respectively. In the same setup, reference electrode was calibrated with respect to the reversible hydrogen electrode (RHE) where Pt gauze was used for both counter and the working electrode, resulting in 0.230 V shift vs. RHE. The potential was swept from 0 to −1.0 V vs. Ag/AgCl electrode at the scan rate of 50 mV/s using a Biologic Potentiostat SP-150. Applied overpotential to the cell is converted using the Nyquist equation (Eq. 2) to RHE potential where for 3M Ag/AgCl electrode E$_{Ag/AgCl}^0$−RHE=0.21 V.

$$E_{RHE}(V) = E_{Ag/AgCl-RHE}^0 + E_{applied\ overpotential\ using\ Ag/AgCl} + 0.0592 \times pH \qquad \text{(Eq. 2)}$$

The pH of the electrolyte was measured using a Thermo Scientific Orion Star A111 pH meter before and after the CV experiments. The average measured pH of the electrolyte was approximately 0.35.

S6. Differential Electrochemical Mass Spectroscopy

S6.1. Precise Onset Overpotential Measurement

The Hiden HPR-40 DEMS Membrane Inlet Mass Spectrometer (MIMS) was used to determine the precise onset overpotential for HER using Mo$_3$P catalyst. The experiment was performed in a sealed two-compartment three-electrode cell purchased from Hiden Analytical Inc. The batch cell was under ultrahigh-vacuum pressure (1×10$^{-8}$ Torr) during the experiment. A CHI-600D Potentiostat was used to sweep the potential from 0 to −1.0 V vs. Ag/AgCl reference electrode (Innovative Instruments) in a cyclic voltammetry experiment at the scan rate of 50 mV/s. The cathode compartment of the cell was separated from the anode using an anion exchange membrane (Selemion AMV) and the evolved hydrogen at the cathode was transferred to the mass spectroscopy device once generated due to the ultra-high vacuum. To measure the onset potential of Mo$_3$P catalysts, four independent DEMS experiment was conducted precisely, and the results are in Table 1.

S6.2. Number of Transferred Electrons

The number of electrons transferred in HER using Mo$_3$P catalyst was studied by a chronoamperometry (CA) experiment coupled with DEMS. Prior to the CA experiment, the DEMS instrument was calibrated for hydrogen using a custom-made setup. The setup consisted of a streamline with a sample loop of known volume, as well as a pressure gauge to monitor the pressure of the streamline. The streamline was filled with hydrogen gas at different known pressures and then injected to the DEMS. Next, the changes in the hydrogen pressure signal was monitored and correlated to the known moles of hydrogen. The calibration curve is shown in FIG. 13.

Once the DEMS instrument was calibrated, the CA experiment was performed at an overpotential of 200 mV using the same setup discussed in section S6.1. The CA results is shown in FIG. 14.

Next, using Eq. 3, the number of transferred electrons was measured in this experiment.

$$e^- / H_2 = i(A) / \left\{ \left[ 96,485 \left( \frac{c}{mole^-} \right) \right] \times moles\ of\ hydrogen\ detected\ by\ DEMS \right\} \qquad \text{(Eq. 3)}$$

S7. Product Formation Rate Calculation

The molar quantity of hydrogen formation was reported for each catalyst with respect to the surface area of the working electrode (1 cm$^2$) and the weight of the catalyst loading (0.5 mg). The following Eq. 4 was used to determine the product formation rate in each catalyst.

$$\text{Product formation rate (mol/s·cm}^2\text{·g}_{cat.}) = i(A/cm^2)/\{ \\ [96,485 \text{ (C/mol } e^-)] \times [2 \text{ mol } e^-/1 \text{ mol } H_2] \times \\ [g_{catalyst\ loading}]\} \qquad \text{(Eq. 4)}$$

S8. Number of Active Sites and Turnover Frequency (TOF) Measurements

Turnover frequency (TOF) measurements were performed to characterize the intrinsic electronic activity of molybdenum (Mo) active sites in each catalyst. The measurements show that the number of Mo atoms per 1 nm² surface area of the catalyst is 12, 6, 8, and 7 atoms for Mo₃P, MoP, Mo₂C, and MoS₂ catalysts, respectively.

Figure 15:
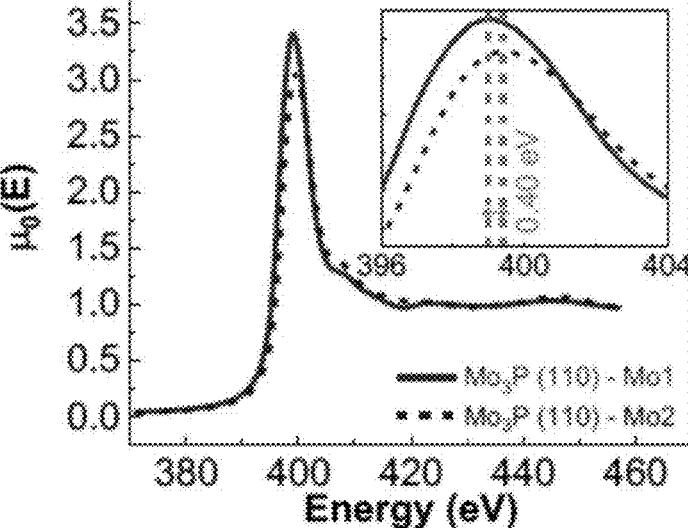
FIG. 15 shows XANES spectrum comparing M3 absorption energy for $Mo_3P$ Mo1 and Mo2 crystallographic sites at the (110) surface.

Further, the roughness factor (RF) technique was used to determine the number of active sites of the catalysts. The RF number for each catalyst was then calculated with respect to its double layer capacitor ($C_{dl}$) compared with a standard flat capacitor (Table 2). First, cyclic voltammetry (CV) experiments were performed in 0.1 M HClO₄ at different scan rates in the non-faradaic region, as shown in FIGS. 15a-c.

Figure 16:
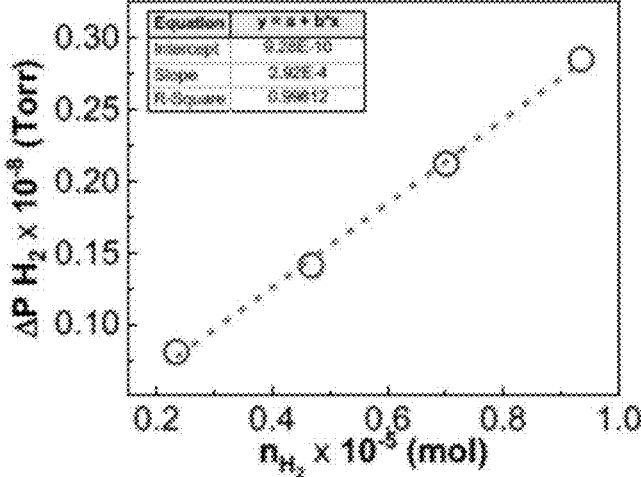
FIG. 16 shows a calibration curve for hydrogen detection using DEMS instrument.

The $C_{dl}$ value for each catalyst was then extracted from the slope of the "current density –scan rate" plot as shown in FIG. 16. Based on this figure, Mo₃P nanoparticles, MoP, and Mo₂C nanoflakes exhibit $C_{dl}$ value of 2.4, 2.71, and 2.49 mF/cm², respectively.

The RF number was calculated from the Eq. 5 where the flat standard capacitor is derived from literature (Table 2).

$$RF = \frac{C_{dl}}{\text{flat standard capacitor}} \qquad \text{(Eq. 5)}$$

The number of Mo active sites in each catalyst was then obtained by Eq. 6.

$$\text{Density of Mo atoms in the catalyst} \\ \text{(sites/cm}^2) = \text{Density of Mo atoms for standard} \\ \text{sample (sites/cm}^2) \times RF \qquad \text{(Eq. 6)}$$

Figure 17:
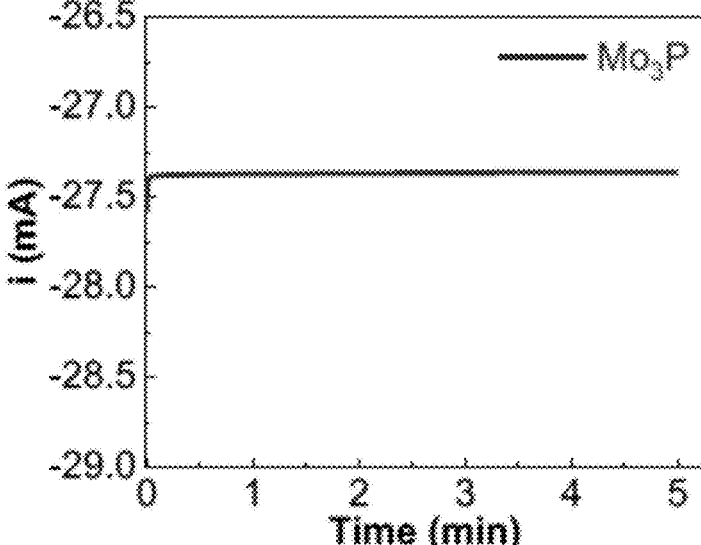
FIG. 17 shows a chronoamperometry (CA) experiment at 200 mV overpotential, indicating constant current of −27.35 mA during 5 minutes of HER on the $Mo_3P$ catalyst.
Figure 18:
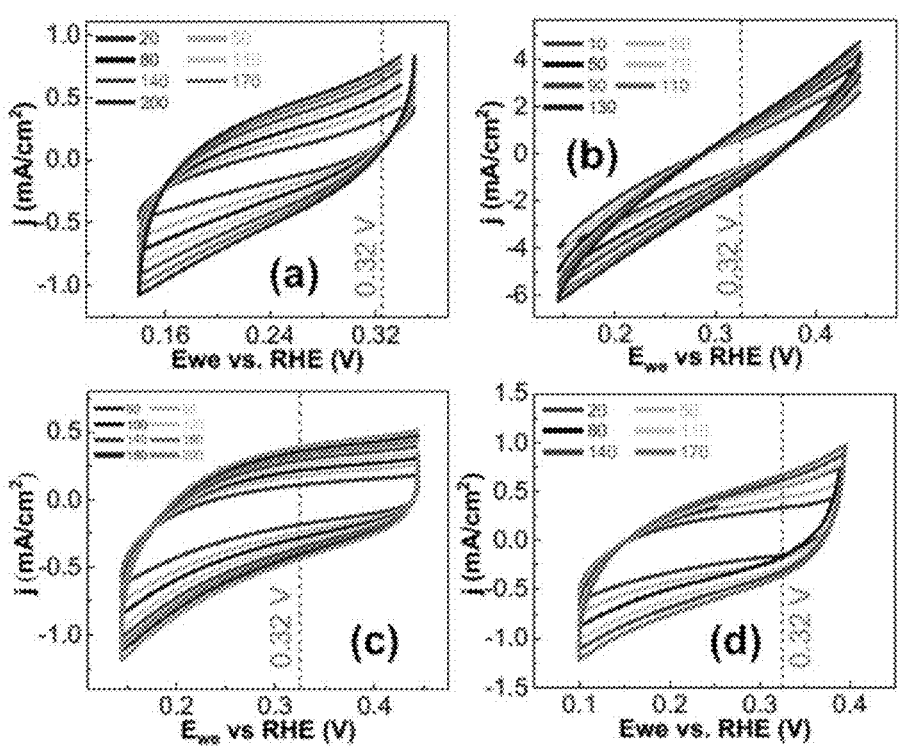
FIG. 18 shows cyclic Voltammetry (CV) curves of: (a) $Mo_3P$ nanoparticles; (b) MoP; (c) $Mo_2C$; and (d) $MoS_2$ NFs at different scan rates. Experiments were performed in 0.1 M $HClO_4$ electrolyte by Sweeping the potential in non-faradic region.

Next, as shown in FIG. 17, the TOF of Mo active sites for hydrogen evolution reaction (HER) in each catalyst was measured with respect to the Eq. 7.

$$\text{TOF}_{catalyst}(1/s) = i_0 \text{ (A/cm}^2)/\{[\text{Density of Mo atoms in} \\ \text{the catalyst (sites/cm}^2)] \times [1.602 \times 10^{-19} \text{ (C/}e^-)] \times \\ [2e^-/H_2]\} \qquad \text{(Eq. 7)}$$

S9. Exchange Current Density measurements

In Table 3, the exchange current density at zero overpotential for the studied catalysts is summarized. These values are obtained from the Tafel plot shown in FIG. 4b.

S10. Work Function Measurements—Ultraviolet Photoelectron Spectroscopy (UPS)

Surface work function measurements were carried out using a Thermo Scientific ESCALAB 250 XI photoelectron spectrometer using He I (21.2 eV) ultraviolet radiation and the pass energy of 8.95 eV.

S11. Long-Term Stability Experiment

Figure 19:
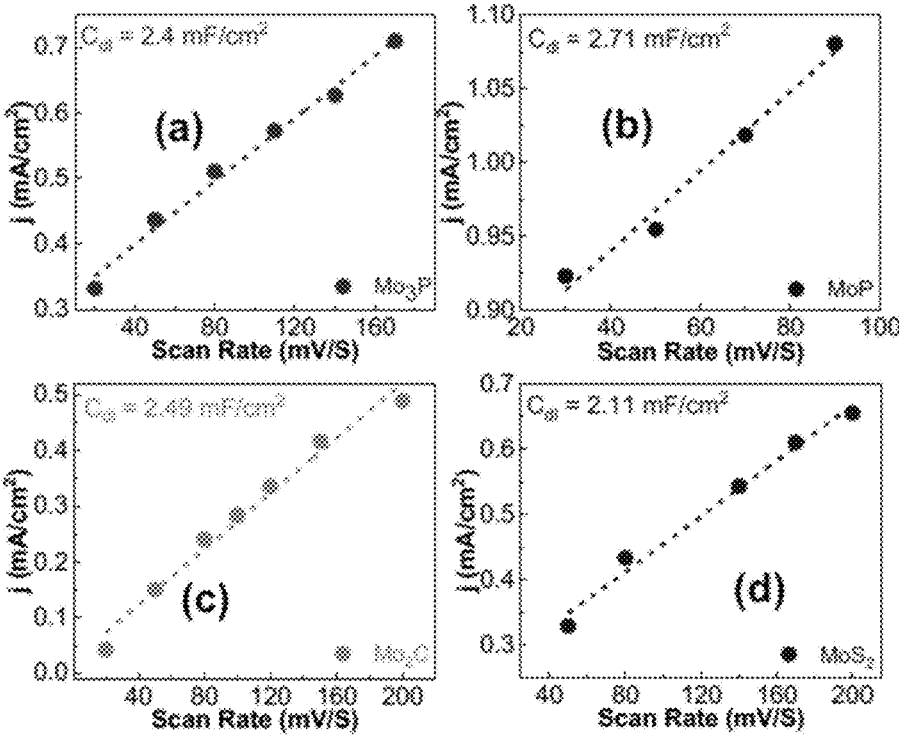
FIG. 19 shows Double Layer Capacitance Calculation for: (a) $Mo_3P$ nanoparticles, (b) MoP, (c) $Mo_2C$, and (d) $MoS_2$ NFs. Plots show the current density at potential of +0.32 V vs RHE as a function of scan rate.

Long-term stability of Mo₃P catalyst is confirmed with performing chronoamperometry (CA) test in 0.5M H₂SO₄ electrolyte at 200 mV vs. RHE. The catalyst loading, and the geometrical surface area of the working electrode was 0.0005 g and 1 cm², respectively. To check the stability of the catalyst, XPS experiments were performed using a Thermo-Scientific ESCALAB 250Xi instrument equipped with an electron flood and scanning ion gun. Obtained spectra were all calibrated to the C 1s binding energy at 284.8 eV. Thermo-Advantage software was used to quantify the atomic concentration of each element within the samples. FIGS. 19a-b indicate the XPS spectra of Mo₃P nanoparticles before and after 40 hrs of CA test, respectively. Standard Mo $3d_{5/2}$ (~228.2 eV) and Mo $3d_{3/2}$ (~231.4 eV) peaks shown in these figures are consistent with existence of Mo$^\delta$, $0 < \delta < 4$, present in Mo₃P structure, confirming the stability of the Mo₃P catalyst.

S12. Density Functional Theory Calculations

A comparative theoretical study was used to further elucidate the origin of intrinsic electronic property of Mo₃P, MoP and MoS₂ catalyst using HAADF images of (110), (100), and (100) slabs, respectively.

S12.1. Optimized Unit Cells of Mo₃P, MoP, and MoS₂ Catalysts

First, the optimization of the atomic structures of both slabs was performed. All the slabs were neutral (stoichiometric compositions were used). For Mo₃P (110) slab, a cell containing 48 Mo and 16 P atoms whose dimensions are 1×1×2 unit cells was used. For MoP (100) slab, a 5×3 unit cell with three layers was used as a minimum. The cell size is 16.035×16.78878×32 Å³ and contains 90 Mo and 90 P atoms. For MoS₂ a slab with dimensions of 5×5×2 unit cells was used, which contains 100 Mo and 200 S atoms. The surface perpendicular dimension is 48 Å. These sizes exclude mutual interactions between images in the periodic boundary conditions. The density functional theory (DFT) was employed to perform all quantum mechanical calculations as implemented in the SIESTA package. PBE functional was used, with the DZP atomically localized basis set and norm-conservative pseudopotential with the cutoff energy of 400 Ry. The Brillouin zones of the unit cells were sampled by the Monkhorst-Pack grid with the k-point grid 5×5×1. Geometry optimization was carried out using the conjugate gradients algorithm until all the forces were less than 0.04 eV/A and the stress in the periodic direction was smaller than 0.01 GPa. In FIGS. 20a-f, optimized unit cells of Mo₃P (110), MoP (100), and MoS₂ (100) used in the simulations are presented.

S12.2. Charge Distribution Analysis

The charge distribution in Mo₃P, MoP, and MoS₂ materials was analyzed. The Mulliken charge analysis was performed, which shows that MoP is qualitatively different from MoN and MoC since phosphorous in MoP is a weak donor rather than a weak acceptor. The average Mulliken charge on Mo is −0.195 and on P is 0.195. This is a surprising result which suggests that the catalytic activity of MoP is associated with additional population of the charge density on Mo-atoms. To check the consistency of this as well as to evaluate redistribution of charges between Mo and P across the slabs result the Bader charge analysis was performed, shown in FIG. 5a and FIG. 21, which is free from the drawback of the Mulliken charges known to strongly depend on the basis set.

S12.3. Density of States (DOS) Analysis

Figure 22:
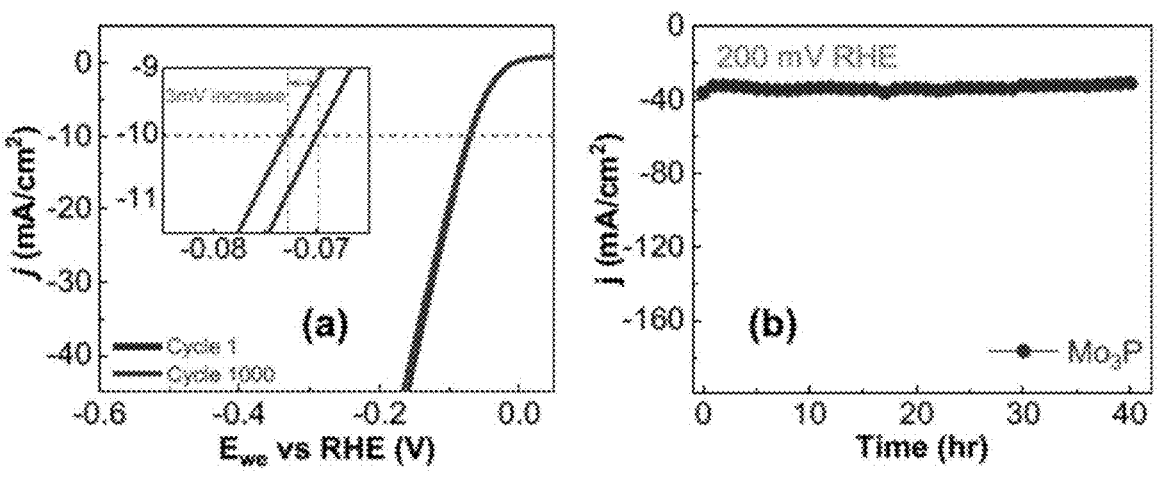
FIG. 22 shows: (a) HER cycle stability assessment of the $Mo_3P$ nanoparticles. Inset shows the zoom-in curves for $1^{st}$ and $1000^{th}$ cycles, indicating negligible overpotential increase (3 mV) to achieve the current density of −10 $mA/cm^2$; and (b) HER long-term stability assessment of the $Mo_3P$ nanoparticles using CA experiment for 40 hours, showing only 9.2% loss in the current density obtained at 200 mV vs. RHE.
Figure 23:
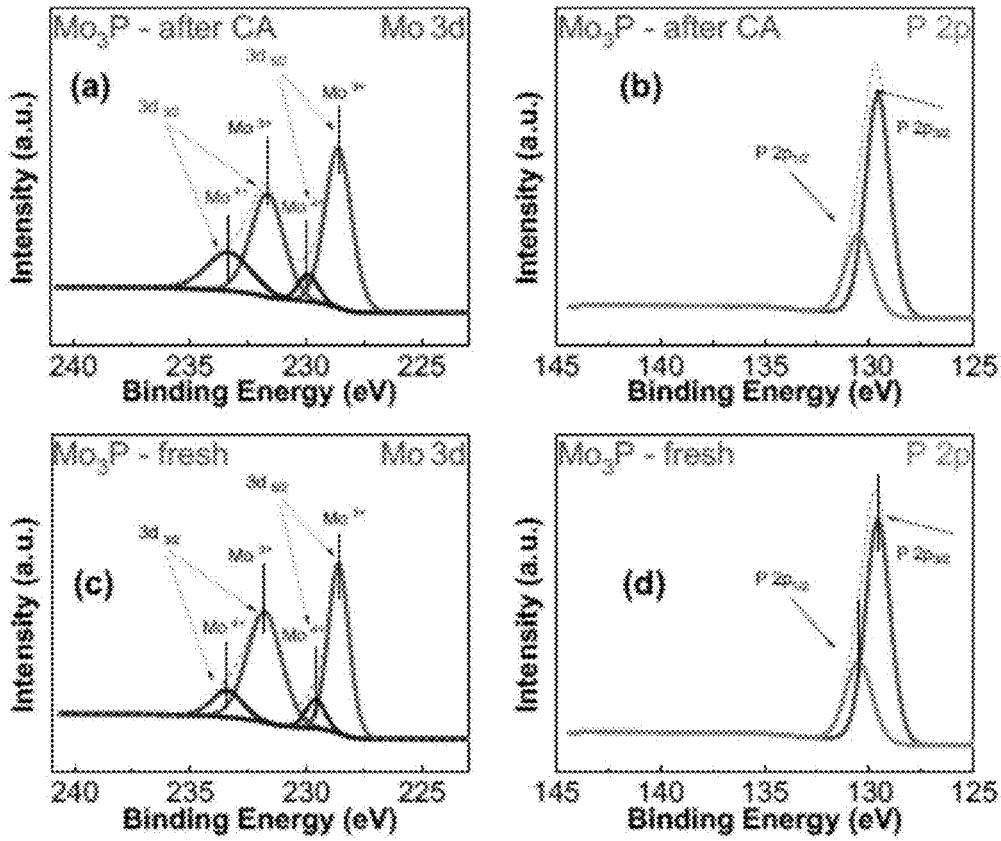
FIG. 23 shows x-ray photoelectron spectroscopy (XPS) spectra of $Mo_3P$ samples (a, b) after 40 hrs of CA experiment, and (c, d) fresh sample. No obvious shift or change in the peaks position of both Mo 3d and P2p spectra was observed after 40 hours CA experiment.

The total and element projected density of states (PDOS) for Mo₃P, MoP, and MoS₂ materials was calculated. The total and element projected density of states for Mo₃P, MoP, and MoS₂ catalysts are shown in FIGS. 22a-c, respectively. The contributions from the surface-like and bulk-like Mo-atoms in Mo₃P, MoP, and MoS₂ are also shown in FIGS. 22d-f and 23, respectively. The energy scale in these figures is with respect to the Fermi energy level.

S12.4. Analysis of Mo-PDOS and DFT Calculated Work Functions

Figure 24:
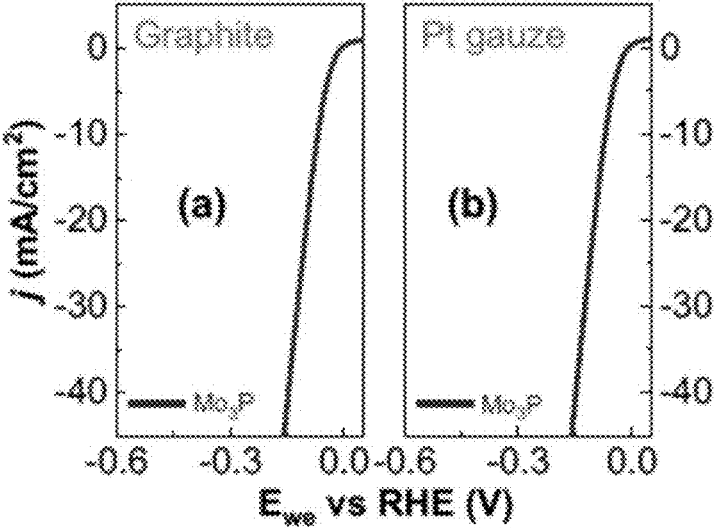
FIG. 24 shows CV experiments for $Mo_3P$ sample using (a) graphite rod as the counter electrode and (b) Pt gauze as the counter electrode.

In order to compare the electronic structures of these materials, comparative analysis of Mo-PDOS was performed. The projected density of states (PDOS) on molybdenum and phosphorous in different catalysts was performed (FIG. 5c and FIG. 24).

Figure 25:
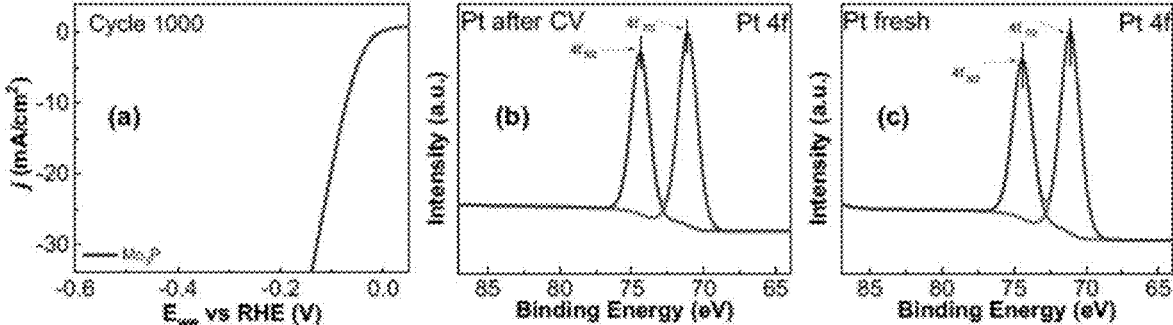
FIG. 25 shows: (a) CV experiment of the $Mo_3P$ sample after 1000 cycles. XPS spectra of Pt 4f; (b) after the CV experiment; and (c) fresh sample. It can be concluded that the observed HER activity is only from $Mo_3P$.
Figure 26:
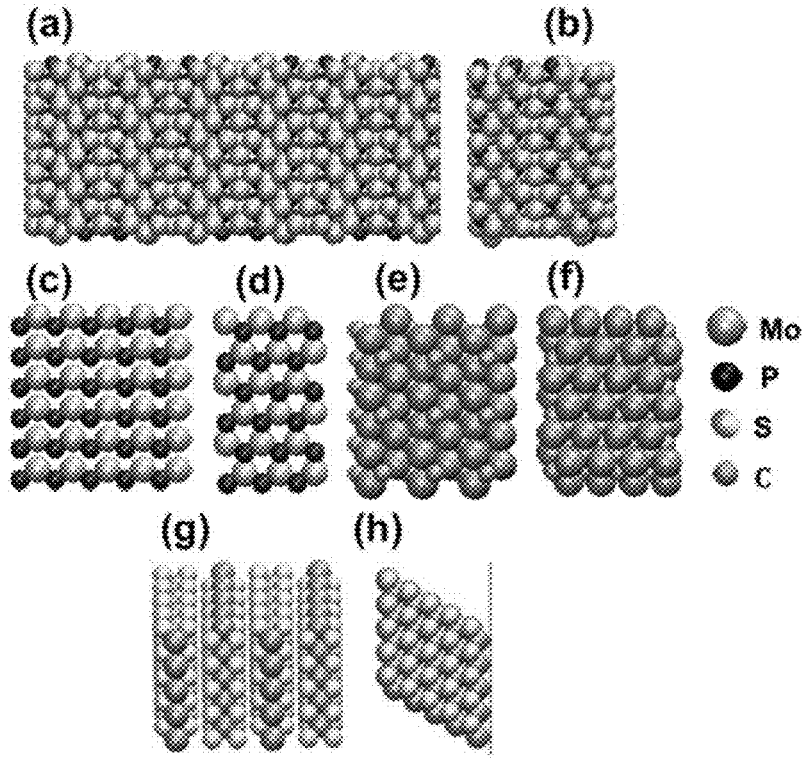
FIG. 26 shows: a computational model for $Mo_3P$ Mo-terminated (110) surface with (a) top view and (b) side view; a computational model for MoP (100) surface (c) top view and (d) side view; a computational model for Mo2C (001) surface (e) top view and (f) side view; and a $MoS_2$ (100) (g) top view and (h) side view.

To compare the work functions of the materials, the Hartree electrostatic potential was used at the edges of the cell (z-direction) as a reference for the Fermi energy level (FIGS. 25a-c). In order to align the vacuum levels, the effective screening model (ESM) was used as implemented in the SIESTA package with the vacuum boundary conditions for the Poisson equation. This approach guarantees the flatness of the electrostatic potential at the boundary and automatically accounts for the effects of the cell dipole (if any). The key metric for the comparison of materials are the values of the Mo-PDOS at the Fermi energy level and the mutual positions of Fermi energy levels. The former accounts for the number of electronic states that could be involved in the charge transfer, and the latter signifies the availability of these states and the ease for the charge transfer.

S12.5. Density Functional Theory Calculation for Hydrogen Adsorption

First-principles calculations are performed to study the adsorption of hydrogen atoms on the surfaces of $Mo_2C$, MoP and $Mo_3P$. The catalytic surfaces are modeled by slab models with atomic layers of at least 15 Å in thickness and a 15 Å vacuum spacing. The lateral dimensions of the slabs are fixed at equilibrium bulk sizes, but all internal coordinates are allowed to relax until forces on each atom are below 0.01 eV/A. The surface energies of low-index catalytic surfaces are calculated, and the atomic hydrogen adsorptions are investigated on the lowest-energy surface termination of the catalysts. The calculations are based on DFT as implemented in the Vienna ab initio Simulation Package (VASP) using the projector-augmented wave (PAW) method. The generalized gradient approximation (GGA) of Perdew-Burke-Ernzerhof (PBE) is used to approximate the electronic exchange and correlation. The energy cutoff for the plane wave basis set of the electronic wave functions is 520 eV. The Brillouin-zone integrations are sampled using gamma-centered Monkhorst-Pack k-point meshes corresponding to an m×n×1 grid with at least 2000 k-points per reciprocal atom (KPPRA).

Regardless of detailed reaction mechanism, the adsorption free energy of hydrogen $\Delta G_{H*}$ is an effective descriptor for the HER activity where an ideal HER catalysts should yield a thermal neutral $\Delta G_H*$. The adsorption free energy of hydrogen was defined as:

$$\Delta G_{H*} = \Delta E_{H*} + \Delta E_{ZPE} - T\Delta S_H \qquad (Eq.\ 8)$$

The hydrogen adsorption enthalpy $\Delta E_{H*}$ relative to molecular $H_2$ is calculated as:

$$\Delta E_{H*} = \left[ E_{H*} - E_* - \frac{n}{2} E(H_2) \right] / n \qquad (Eq.\ 9)$$

where * represent an adsorption site on the catalytic surface, $E_{C*} - E_*$ is the total energy difference between the hydrogen covered surface and the clean surface, n is the number of hydrogen atoms. The energy contribution of $\Delta E_{\hat{a}\hat{a}D} - T\Delta S_C$ was estimated to be 0.24 eV at standard conditions.

Figure 27:
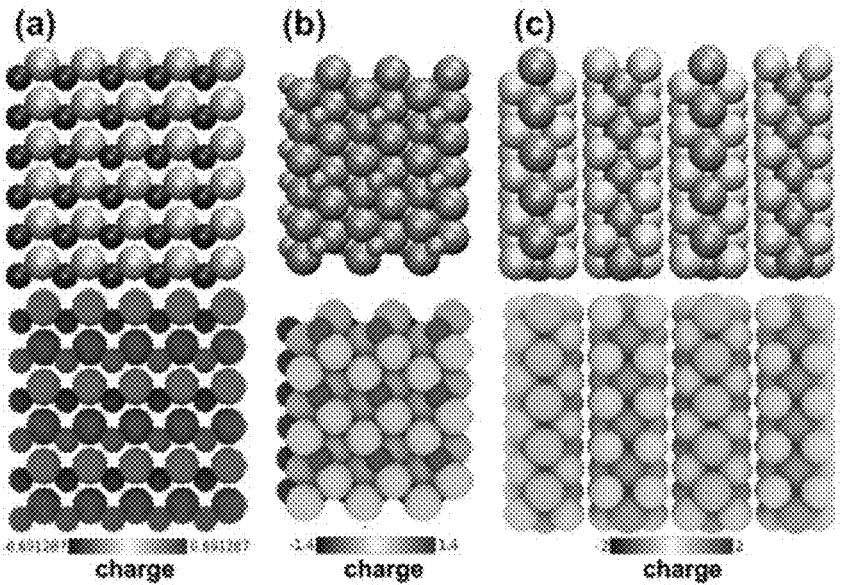
FIG. 27 shows an analysis of Bader charges for: (a) MoP (100); (b) $Mo_2C$ (001); and (c) $MoS_2$ (100).

Computational results for $Mo_3P$ are shown in FIGS. 26a-g. As a comparison, results for low-energy $Mo_2C$ and MoP surfaces are shown in FIG. 27. Hydrogen prefers binding to the top site of C on $Mo_2C$ (001) and P on MoP (100) (FIGS. 27a-b). While both surfaces show desirable $\Delta G_{H*}$ for the HER activity, the $\Delta G_{H*}$ is closer to thermal neutral on MoP. MoP (100) also has a higher density of active sites (P) for hydrogen adsorption, which suggests better HER activity compared to $Mo_2C$ (001).

Thus the invention provides improved catalysts for electrocatalytic cells. The earth-abundant and relatively inexpensive tri-transition metal phosphide class of catalysts are useful in large-scale energy conversion and storage systems. Establishing this class of materials with outstanding catalytic properties will also encourage the researchers to use them in other catalysis process for sustainable energy technologies that are mainly stymied due to lack of suitable and inexpensive materials.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of generating hydrogen gas, comprising:
providing an electrocatalytic energy conversion cell comprising a first electrode including a tri-transition metal phosphide catalyst, a second electrode comprising an anodic material, and an electrolyte disposed between the first electrode and the second electrode, wherein the catalyst is selected from the group consisting of $Zr_3P_m$, $Hf_3P_m$, $Ta_3P_m$, $Tc_3P_m$, and $Re_3P_m$, wherein m is independently one of 1, 2, 3, 4 or 5;
applying an electrical potential to the first and second electrodes;
reducing hydrogen ions in the electrolyte at the first electrode; and
collecting the hydrogen gas.

2. The method of claim 1, wherein the catalyst improves formation of hydrogen gas at a lower overpotential and a higher reaction rate than in the method without the catalyst.

3. The method according to claim 1, wherein the first electrode is coated with the catalyst.

4. The method according to claim 1, wherein the catalyst comprises a nanosized catalyst (1-1000 nm).

5. The method according to claim 1, wherein the catalyst comprises nanoparticles, nanoflakes, nanosheets and/or nanoribbons.

6. The method according to claim 1, wherein a hydrogen evolution reaction occurs at the first electrode.

7. The method according to claim 1, wherein oxidation and reduction reactions occur at the first electrode.

8. The method according to claim 1, wherein the tri-transition metal phosphide catalyst is disposed between the first electrode and the electrolyte.

9. The method according to claim 1, further comprising a reference electrode disposed in contact with the electrolyte.

10. The method according to claim 1, wherein the catalyst comprises a plurality of nanoparticles.

11. The method according to claim 10, wherein the nanoparticles have an average size between about 1 nm and 1000 nm.

12. The method according to claim 1, wherein the catalyst comprises nanoflakes.

13. The method according to claim 1, wherein the catalyst comprises a nanosheet or nanoribbon.

\* \* \* \* \*